(12) United States Patent
Bell

(10) Patent No.: US 6,170,030 B1
(45) Date of Patent: Jan. 2, 2001

(54) METHOD AND APPARATUS FOR RESTREAMING DATA THAT HAS BEEN QUEUED IN A BUS BRIDGING DEVICE

(75) Inventor: Michael D. Bell, Beaverton, OR (US)

(73) Assignee: Intel Corporation, Santa Clara, CA (US)

(*) Notice: Under 35 U.S.C. 154(b), the term of this patent shall be extended for 0 days.

(21) Appl. No.: 09/012,775

(22) Filed: Jan. 23, 1998

(51) Int. Cl.[7] .............................. G06F 13/00; G06F 13/38
(52) U.S. Cl. .............................. 710/129; 710/39; 710/54; 710/55; 709/231; 711/3; 711/137; 711/139; 711/202
(58) Field of Search ................................ 710/129, 39, 54, 710/55; 709/231; 711/137, 202, 3, 139

(56) References Cited

U.S. PATENT DOCUMENTS

| | | | |
|---|---|---|---|
| 5,398,325 | * | 3/1995 | Chang et al. ............................ 711/3 |
| 5,463,637 | * | 10/1995 | Hayashi ................................. 714/718 |
| 5,544,293 | * | 8/1996 | Keizou ................................. 711/202 |
| 5,586,294 | * | 12/1996 | Goodwin et al. ..................... 711/137 |
| 5,664,117 | * | 9/1997 | Shah et al. ............................ 710/100 |
| 5,749,094 | * | 5/1998 | Jaggar ................................. 711/139 |

OTHER PUBLICATIONS

PCI System Architecture, Third Edition, Shanley, et al., Sep. 1997, pp. 97–104 & 381–455.
PCI Local Bus Specification, Revision 2.1s, PCI Speical Interest Group, Jun. 1, 1995, pp. ii–xvi & 1–282.

* cited by examiner

Primary Examiner—Glenn A. Auve
Assistant Examiner—Frantz Blanchard Jean
(74) Attorney, Agent, or Firm—Blakely, Sokoloff, Taylor & Zafman LLP

(57) ABSTRACT

An apparatus and method for restreaming data that has been queued in a bus bridging device. Data received via a first bus is stored in a first queue. A first portion of the data is output from the first queue onto a second bus while a second portion of the data remains in the first queue. In response to another data value being transferred from the first bus to the second bus before the second portion of the data is output to the second bus, the second portion of the data in the first queue is invalidated.

57 Claims, 12 Drawing Sheets

METHOD AND APPARATUS FOR RESTREAMING DATA THAT HAS BEEN QUEUED IN A BUS BRIDGING DEVICE

FIELD OF THE INVENTION

The present invention relates to the field of managing data flow in a computer system, and more particularly to transferring data between devices on different sides of a bus bridge.

BACKGROUND OF THE INVENTION

To support the high-bandwidth data transfers demanded by modern computer applications, data is clocked across the buses of today's computer systems at tremendous rates. To achieve reliable, high-speed data transfer, a computer system often includes a number of buses arranged in a hierarchy and interconnected by devices called bus bridges.

In essence, a bus bridge is a load isolating device that allows multiple devices to appear as a single capacitive load to the bus to which they are bridged. Although the reduced capacitive loading increases the maximum frequency at which a bus can be operated, the bridge adds a layer of complexity in the design and operation of the computer system. Further complexity may result if the bridge is used to interconnect different types of buses.

One reason that bus bridges add complexity is that requests to transfer data from a requester side of a bridge to a target side of the bridge must often be buffered in the bridge. One reason for this is that the bridge must usually arbitrate with other devices gain control of the target-side bus. Because this arbitration time may vary, it is usually desirable to buffer the requested data transfer and then cause the device which requested the data transfer to relinquish the requester-side bus. Using this approach, other transfers may take place on the requester-side bus while the bus bridge is performing the requested data transfer. If a read operation has been requested, the returned data also must typically be buffered while the bridge notifies the requester that the data is available (or while the bridge waits for the requester to ask if the data is available) and while the requester arbitrates to re-gain control of the requester-side bus.

It will be appreciated that the above-described buffering of requests and data imposes a latency penalty on any data transfer which must cross the bus bridge. Moreover, because the latency penalty is incurred with each transfer across the bridge, the smaller the quantum of data per bridged transfer, the lower the effective bandwidth of the data transfer.

One technique used to avoid loss of bandwidth due to bus bridging is to prefetch additional data in response to each data transfer request. Assuming that the prefetched data is actually used by the requesting device, prefetching effectively increases the quantum of data per bridged transfer and therefore increases the effective bandwidth of data transfer across the bridge.

One problem that may arise when data is prefetched, however, is that, even though the requesting device may need the prefetched data, its internal data buffer may be too shallow to read all of the prefetched data in the bridge in a single read transaction. Consequently, after retrieving a portion of the prefetched data, the requesting device relinquishes control of the requester-side bus (i.e., the requesting device "disconnects") while it performs the internal operation of transferring the data from its internal data buffer to its other internal resources. Because the requesting device has relinquished control of the bus, the bridge assumes that the requesting device has completed its transfer and reallocates the prefetch buffer for other data transfer operations (remember, the bridge caused data to be prefetched without knowing for certain how much of the prefetched data would be used). The prefetched data remaining in the prefetch buffer is lost when the buffer is reallocated. Consequently, if the requesting device re-gains control of the requester-side bus and attempts to read data beginning where it left off, the read transaction must now cross the bridge and be handled by target-side devices instead of simply accessing data in a prefetch buffer. Thus, in cases where the data buffer of the requesting device is substantially shallower than the prefetch buffer in the bridge, the bandwidth gains achieved by data prefetching can be significantly eroded.

Loss of prefetched data is usually not a problem in a bus bridge that is specifically designed to support split transactions. In a split transaction bus, each transfer request is typically accompanied by an identifier that identifies the requesting device. The identifier allows prefetched data to be matched with a requesting device even if the requesting device disconnects and then reconnects. For example, if a portion of the prefetched data is transferred to a requesting device which then disconnects, the bus bridge can use the identifier which accompanies a subsequent read request to determine whether the subsequent read request is from the same requesting device. If so, the bridge may resume transfer of the prefetched data at the point where the requester stopped the initial transfer. This is referred to as "restreaming" the prefetched data. If the request for the remaining prefetched data is not from the same requester or does not hit the prefetch buffer (i.e., does not request to read data from a prefetched address), a new prefetch operation may be required.

Although the split transaction bus facilitates restreaming of prefetched data after requester disconnect, requiring a the device identifier to accompany each bus transaction adds significant complexity in the design and operation of the computer system. For example, additional signal paths are typically required to carry the device identifier and additional control logic is usually needed to associate device identifiers with respective transactions. Because of this added complexity in design and operation, many types of buses do not require or support requester identification and loss of prefetched data upon requester-disconnect remains a problem.

One solution to the problem of a disconnecting requester is to provide a cache memory in the bridge. By maintaining coherency between data in the in-bridge cache and data in system memory (which is typically on the non-requester side of the bridge), memory read requests that hit the in-bridge cache can be filled without crossing the bridge. Using this technique, no matter how many times a requester disconnects and reconnects (i.e., relinquishes and then reacquires the bus), further access to the non-requester-side bus is not required until a cache miss occurs. Of course, if cache coherency is lost due to modification of the data in system memory, the corresponding cache line in the bridge is invalidated and a further request to read data from that cache line requires the bridge to be crossed in a new prefetch operation.

Unfortunately, in-bridge caching schemes typically require significant additional resources. For example, the bridge must include a cache memory, which typically includes at least a data array, tag array, hit/miss logic and cache line invalidation logic. Also, snooping logic is usually required to maintain coherency between system memory and the bridge's cache. The need for these extra resources significantly increases the complexity and cost of the bridging device. Further, the snooping logic typically presents an additional load on the snooped bus (often the speed-critical, host-side bus), potentially limiting the maximum transfer-rate on that bus.

SUMMARY OF THE INVENTION

An apparatus and method for restreaming data that has been queued in a bus bridging device are disclosed. Data received via a first bus is stored in a queue. A first portion of the data in the queue is output to a second bus while a second portion of the data remains in the queue. The second portion of the data in the queue is invalidated in response to another data value being transferred from the first bus to the second bus before the second portion of the data is output to the second bus.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments of the present invention, data restreaming is achieved in a bus-bridging device without requiring requester identification or bus snooping logic. In response to a data transfer request, data is prefetched an stored in a queue until the requester regains control of the bus and initiates transfer of the prefetched data from the bridge to the requester. Unlike some prior-art techniques, if the requester relinquishes control of the bus before all of the prefetched data is transferred, the queue which holds the prefetched data is not invalidated. Instead, the bridging device monitors data transfer between the buses to which it is coupled to enforce a set of queue management rules. If a queue management rule is violated or if reclamation of the queue that holds the prefetched data is required, the bridging device invalidates the contents of the queue and reclaims the queue for use in subsequent data transfer operations. Otherwise, if a request to read data from a partially streamed queue is received, the bridging device will restream the data in the queue. Because the data in the queue is restreamed, each new data read request does not have to cross the bridge and therefore does not necessarily incur the latency penalty associated with usual bridge-crossing transactions. Thus, it is an intended advantage of the present invention to improve the throughput of a bridging device in a computer system without requiring the increased complexity and resource drain required by prior-art techniques. These and other intended advantages of the present invention are apparent from the following description.

Figure 1:
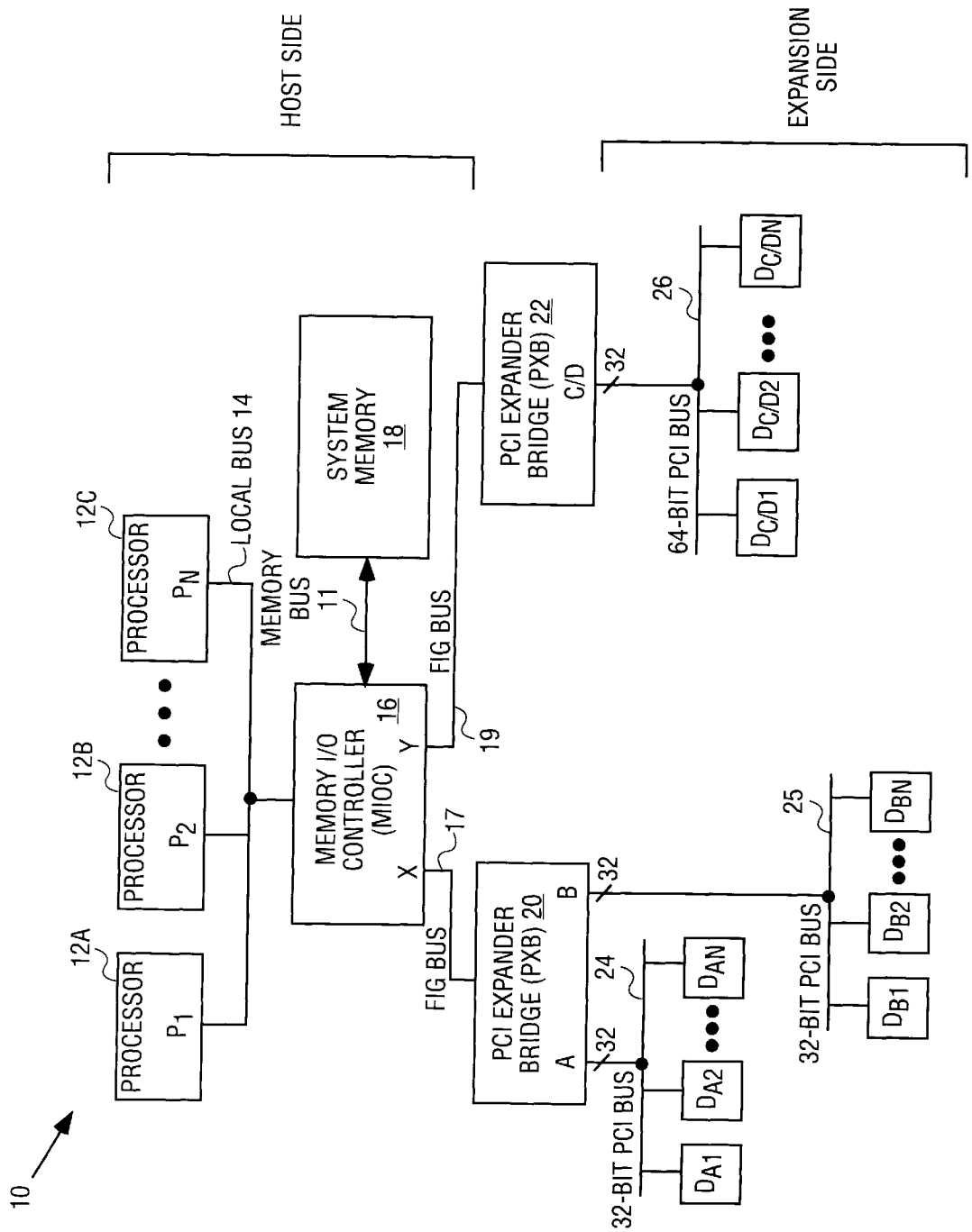
FIG. 1 is a diagram of a computer system in which embodiments of the present invention may be used.

FIG. 1 is a diagram of a computer system 10 in which embodiments of the present invention may be used. One or more processors (12a, 12b, 12c) are coupled to a memory/input-output controller (MIOC) 16 by a local bus 14. The MIOC 16 is coupled via a memory bus 11 to a system memory 18. The system memory 18 is typically made up of an array of dynamic-random-access-memory (DRAM) components, but other memory technologies may also be used. In the embodiment of FIG. 1, the MIOC 16 is coupled to two bus bridging devices (20, 22) via respective Fast16 buses (17, 19). Each FAST16 bus (17, 19) is a high-speed, packet transfer bus that supports bidirectional communication between a respective one of the bus bridging devices (20, 22) and the MIOC 16. The details of the operation of the Fast16 buses (17, 19) are not necessary for an understanding of the present invention and will not be discussed further herein. It will be appreciated that the MIOC 16 may be coupled to more or fewer bridging devices in alternate embodiments and that different types of buses may be used to couple the MIOC to the bridging devices.

For convenience, the portion of the computer system 10 that includes the FAST16 buses (17, 19), MIOC 16, memory bus 11, system memory 18 and processors (12a, 12b, 12c) is referred to as the host-side of the computer system 10 and portion of the computer system 10 shown below the bridging devices (20, 22) in FIG. 1 is referred to as the expansion side of the computer system 10. Also, the term host-side bus is used to refer collectively to any transfer path on the host side of the computer system 10 (e.g., FAST16 bus to MIOC to memory bus, local bus to MIOC to FAST16 bus or local bus to MIOC to memory bus). The term expansion-side bus is likewise used to refer to the various transfer paths on the expansion side of the computer system 10.

The bridging devices (20, 22) are used to support data transfer between the host side and the expansion side of the computer system 10. In the embodiment described herein, the bridging devices (20, 22) are each used to provide an expansion side interface to two 32-bit peripheral component interconnect (PCI) buses (24, 25) or, alternatively, to one 64-bit PCI bus 26. For this reason, each bridging device (20, 22) is labeled in FIG. 1 to be a PCI Expander Bridge (i.e., a "PXB"). If a PXB is configured to support two 32-bit PCI buses, two 32-bit transfer paths provided on the PXB are operated independently as shown by the ports on the PXB 20 labeled "a" and "b". If a PXB is configured to support a single 64-bit transfer, the two 32-bit transfer paths provided on the PXB are operated in combination to form the most significant and least significant slices, respectively, of a 64-bit transfer path as shown by the port on the PXB 22 labeled "c/d".

Herein the expression "PCI bus" refers to a bus that complies with the PCI Local Bus Specification Revision 1.0, published Jun. 22, 1992 by Intel Corporation or later revisions of the PCI Local Bus Specification. The PCI Local Bus Specification is presently managed by a consortium of industry partners known as the PCI Special Interest Group (PCI SIG). Initially the PCI bus was limited to a 32-bit multiplexed address/data path, but in Revision 2.1 published Jun. 1, 1995, support for a 64-bit PCI extension was added. Although exemplary embodiments described herein refer to the PCI bus, application of the present invention is not limited to the PCI bus. Generally, the present invention may be applied to any type of data transfer mechanism in which queued data is output to a requesting device in response to distinct read requests. For example, data transfer via ISA (Industry Standard Architecture), EISA (Extended ISA) or MicroChannel buses could be supported in alternate embodiments. Also, while each PXB (20, 22) is depicted in FIG. 1 as supporting two distinct 32-bit PCI buses or a single 64-bit PCI bus, any number of PCI buses may be supported in alternate embodiments without exceeding the scope of the present invention.

Still referring to FIG. 1, each of the three PCI buses (24, 25, 26) includes a plurality of attached bus devices (i.e., $D_{a1}$, $D_{a2}$–$D_{aN}$ on the port "a" PCI bus, $D_{b1}$, $D_{b2}$–$D_{bN}$ on the port "b" PCI bus, and $D_{c/d1}$, $D_{c/d2}$–$D_{c/dN}$ on the port "c/d" PCI bus). Each of these bus devices may be either a PCI bus master, a PCI bus target, or both a PCI bus master and a PCI bus target. A PCI bus master is a device that is capable of acquiring the PCI bus and initiating a data transfer. A PCI bus target is a device that is capable of responding to a data transfer initiated by a PCI bus master (in PCI bus terminology, this is referred to as claiming a transaction). As an aside, the PCI bus specification specifies a number of signals that are used to control the PCI bus. These signals are occasionally referenced herein and include bus arbitration signals REQ# and GNT#; transaction control signals FRAME#, TRDY#, IRDY#, STOP# and DEVSEL#; clocking signals CLK and CLKRUN#; and other signals. For further information regarding the details of the PCI bus operation, refer to the PCI bus specification.

To appreciate the advantages intended by the present invention, it is helpful to consider a mass storage device controller coupled to an expansion-side PCI bus, such as a Small Computer Systems Interface (SCSI) controller. A SCSI controller is often required to transfer large streams of data between system memory and mass storage and therefore requires the sorts of bridged data transfers which can benefit significantly from the present invention. For example, if a large amount of prefetched data is stored in a prefetch buffer in the PXB 20 in response to a read request from the SCSI controller (to be clear, suppose that the SCSI controller is represented by device $D_{a1}$ on PCI bus 24), it would be desirable for the SCSI controller to acquire as much of the prefetched data as possible each time the SCSI controller gains control of the PCI bus 24. If the SCSI controller has a shallow internal data buffer, however, the SCSI controller may be have to read the prefetched data in relatively small increments and disconnect from the PCI bus after each incremental read. Thus, in prior-art bridging devices that reallocate a prefetch buffer each time a requesting device disconnects, repeated incremental read/disconnect cycles tend to dramatically reduce bridge throughput. In our example, though hundreds or even thousands of data values may have been prefetched, all but a small portion of the prefetched data may be discarded after each disconnection by the SCSI controller. Consequently, a new, bridged access to system memory 18 may be required for each disconnect/reconnect cycle of the SCSI controller. These bridged memory accesses tend to worsen congestion on the host-side data paths which are already burdened by the traffic between the processors and system memory. Thus, it is an intended advantage of the present invention to increase the throughput of bridged data transfers and to reduce traffic congestion in the computer system by reducing loss of data that has been prefetched and queued in a bus bridging device.

Figure 2:
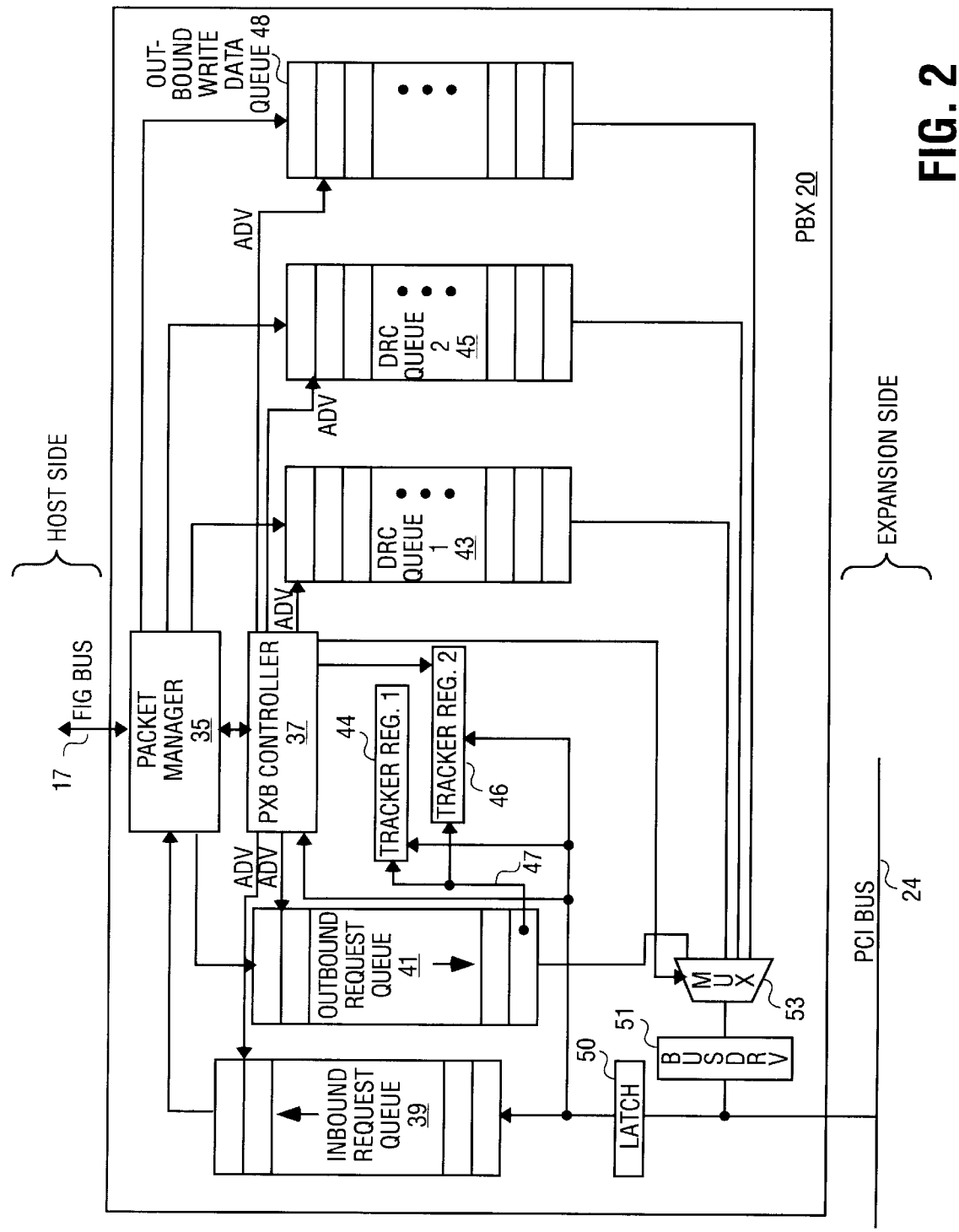
FIG. 2 illustrates a bus bridging device according to one embodiment.

FIG. 2 illustrates a PCI Expander Bridge (PXB) 20 according to one embodiment. The PXB 20 is coupled to a Fast16 bus 17 on its host side and to a PCI bus 24 on its expansion side. The PXB 20 includes a packet manager 35, PXB controller 37, tracker registers (44, 46), an inbound request queue 39, an outbound request queue 41, an outbound write-data queue 48 and delayed read completion queues (DRC queues) 43 and 45. The PXB 20 also includes a latch 50 to latch address, data, command and byte enable signals from the PCI bus 24, a bus driver 51 to drive address, data, command and byte enable signals onto the PCI bus 24 and a multiplexer 53 to select a bus-driving source within the PXB 20. The PXB also includes PCI bus management logic (not shown) for controlling the various arbitration, transaction control, interrupt, clock control and other signals required for PCI bus operation.

The PXB controller 37 includes logic for controlling the overall operation of the PXB 20. The PXB controller 37 monitors traffic on the PCI bus 24 and the Fast16 bus 17 to determine when inbound and outbound transactions have been received (herein, an outbound transaction is a transaction directed from the host side to the expansion side of the PXB 20 and an inbound transaction is a transaction directed from the expansion side to the host side of the PXB 20). If an inbound transaction is received, the PXB controller 37 determines whether the resources required by the transaction are available. If the resources are available, the PXB controller 37 enables a copy of the transaction (e.g., command, address, byte enables) into the inbound request queue 39 and allocates the required resources. If the required resources are not available, the PXB controller 37 signals a retry to the requesting device. A retry is a combination of control signals asserted by a PCI target device to command to a PCI master device (an "initiator" in the language of the PCI specification) to stop the requested transaction and to reattempt the transaction at a later time.

The PXB controller 37 controls the propagation of inbound requests through the inbound request queue 39 by issuing an advance signal (indicated by the line ADV between the PXB controller 37 and the inbound request queue 39) to pop each processed request off the top of the inbound request queue 39 and to advance the remaining requests. When a request to read from or write to a host-side device reaches the head of the inbound request queue 39, it is received and packetized by the packet manager 35 and then transmitted on the Fast16 bus 17. In one embodiment, the packet manager 35 signals the PXB controller 37 as each inbound request is forwarded so that the PXB controller 37 can advance the remaining requests in the inbound request queue 39.

When an outbound request is received via the Fast16 bus 17, the packet manager 35 inspects the packet header to determine the nature of the request and communicates this information to the PXB controller 37. If the outbound request is a read completion (i.e., data that is being returned in response to an earlier inbound read request), the packet header is stripped from the packet by the packet manager 35 and stored in the outbound request queue 41. The payload portion of the packet (i.e., the data) is placed in a DRC queue (43, 45). As outbound requests are processed and popped off the head of the outbound request queue 41, the read completion is advanced through the outbound request queue 41. When the read completion reaches the head of the outbound request queue 41 and the previously retried requesting device repeats its read request, the data from the DRC queue (43, 45) is output to the PCI bus 24 in successive data phases until the DRC queue (43, 45) is emptied or the PCI master disconnects. Outbound write requests are handled in a similar manner, except that the data portion of the packet received via the Fast16 bus is placed in the outbound write-data queue 48 instead of the DRC queue (43, 45). For an outbound read request, the header is placed in the outbound request queue 41 without changing the state of the DRC queues (43, 45) or the outbound write-data queue 48. When data is output from the PXB 20 to the PCI bus, the multiplexer 53 selects, under control of the PXB controller, the source queue (e.g., outbound request queue 41 for address, command and byte enables, and either a DRC queue (43, 45) or the outbound write-data queue 48 for data). The bus driver 51 is used to assert the appropriate PCI bus signal levels.

The tracker registers (44, 46) are used by the PXB controller 37 to control various activities related to inbound read requests. For example, when an inbound read request is received, the address, command and byte enables that are copied into the inbound request queue 39 are also are copied into the appropriate fields of a tracker register (44, 46). The contents of the tracker (44, 46) are then compared to each new transaction that reaches the head of the outbound request queue 41 to determine whether a read completion has occurred. This operation is illustrated by the arrow 47 in FIG. 2.

As previously discussed, once data has been prefetched in response to an inbound read request and stored in a DRC queue (43, 45, it is desirable to avoid loss of the prefetched data when the requesting bus master device disconnects. According to one embodiment, the PXB controller 37 monitors the transaction requests that propagate through the inbound and outbound request queues (39, 41) to gather clues as to whether prefetched data that has been partially consumed (i.e., streamed at least once) can safely be restreamed. These clues are used to set and clear status information in the tracker registers (44, 46).

In order to determine whether partially consumed data can be restreamed, one embodiment of the PBX 20 assumes that inbound and outbound read and write transactions are performed according to a semaphore-based memory access model. A semaphore-based memory access model is one in which data producers and data consumers pass data to one another by writing and reading from a mutually accessible memory regions. A semaphore (i.e., state information such as the value of a piece of data or the presence or absence of a signal) is set according to a predetermined protocol to indicate whether a given memory region is in use. For example, after a producer has stored a block of data in a predetermined memory region, the producer clears a semaphore associated with the memory region. The consumer, which has been polling the semaphore (the semaphore could alternatively be interrupt based), detects that the semaphore has been cleared, and then sets the semaphore for its own use. The consumer reads (or operates on) the data from the memory region and then clears the semaphore to signal the producer that the memory region is again available for use by the producer. Note that a semaphore and its associated memory region do not need to be co-located in memory or even on the same device. For example, the semaphore might be a register in an expansion-side device and the memory region could be in system memory. Alternatively, the memory region could be a buffer in an expansion-side device while the semaphore is located in system memory.

According to one embodiment, the semaphore-based memory access model is used by the PBX 20 to implement a set of DRC queue management rules as follows:

1. A value that is passed from the PBX 20 to the PCI bus 24 in response to an outbound write request is assumed to be a semaphore. Because the semaphore may pertain to data requested in a prior inbound read request, the following actions are taken:
   (i) each DRC queue that has streamed at least once (i.e., at least part of the data in the queue has been read) is reclaimed for use in subsequent inbound read requests and the data in the reclaimed DRC queue is invalidated; and
   (ii) each DRC queue that has valid, but unstreamed data is marked to be non-restreamable (that is, the data in the DRC queue may be streamed in response to a read request from a PCI master device, but once the PCI master device disconnects, the remaining prefetched data is to be invalidated and the DRC queue reclaimed for use in subsequent inbound read requests).
2. A value that is passed from the PBX 20 to the PCI bus 24 in response to an inbound read request is assumed to be a semaphore. Because the semaphore may pertain to data requested in a prior inbound read request, the following actions are taken:
   (i) except for the data in the DRC queue from which the assumed semaphore was read, each DRC queue that has streamed at least once is reclaimed for use in subsequent inbound read requests and the data in the reclaimed DRC queue is invalidated; and
   (ii) each DRC queue that has valid, but unstreamed data is marked to be non-restreamable.
3. A inbound write request that is addressed to a location from which a value in a DRC queue has been obtained is assumed to have come from the PCI master that issued the inbound read request that caused the DRC queue to be filled. Because a subsequent read of that value by the same PCI master would expect to obtain the updated value, the following actions are taken:
   (i) each DRC queue that has streamed at least once is reclaimed for use in subsequent inbound read requests and the data in the reclaimed DRC queue is invalidated; and
   (ii) each DRC queue that has valid, but unstreamed data is marked to be non-restreamable.
4. A first DRC queue is streamed and then stopped such that the value at the head of the DRC queue has been obtained from the same address as a value at the head of second DRC queue that has not yet streamed. To prevent having values from the same address at the heads of the first and second DRC queues, the first DRC queue (i.e., the DRC queue that has streamed) is reclaimed for use in subsequent inbound read requests and the data in the first DRC queue is invalidated.

5. An inbound read request is received, but all DRC queues are in use. To prevent DRC queues from becoming bottled up in restreaming efforts, the following actions are taken:
   (i) the data is invalidated in the DRC queue which is the least recently allocated of the DRC queues to have streamed at least once; and
   (ii) the DRC queue is reclaimed for use in the inbound read request.

By using the above DRC queue management rules, the PBX 20 is able to invalidate the data in a DRC queue only in well-defined circumstances and not, as in prior-art techniques, after every master disconnect from an inbound read. Thus, by preventing the types of restreaming that could lead to use of stale data, but otherwise permitting restreaming to occur, significantly higher data throughput can be realized in the PBX 20. Further, the increased data throughput is achieved without the host-side snooping logic and other overhead typically required by in-bridge cache techniques.

In one embodiment, each of the tracker registers (44, 46) corresponds one-to-one to a respective one of the DRC queues (43, 45) and a status field in each tracker register (44, 46) is used to indicate the status of the corresponding DRC queue (44, 46). This status information indicates whether a DRC queue is in use, whether the DRC queue contains valid data, whether the DRC queue is restreamable and whether the DRC queue has been streamed. It will be appreciated that less or more status information may be maintained in alternate embodiments. It will further be appreciated that while two tracker registers and two DRC queues are shown in the PXB 20 of FIG. 2, there may be any number of tracker registers and corresponding DRC queues in alternate embodiments.

Figure 3:
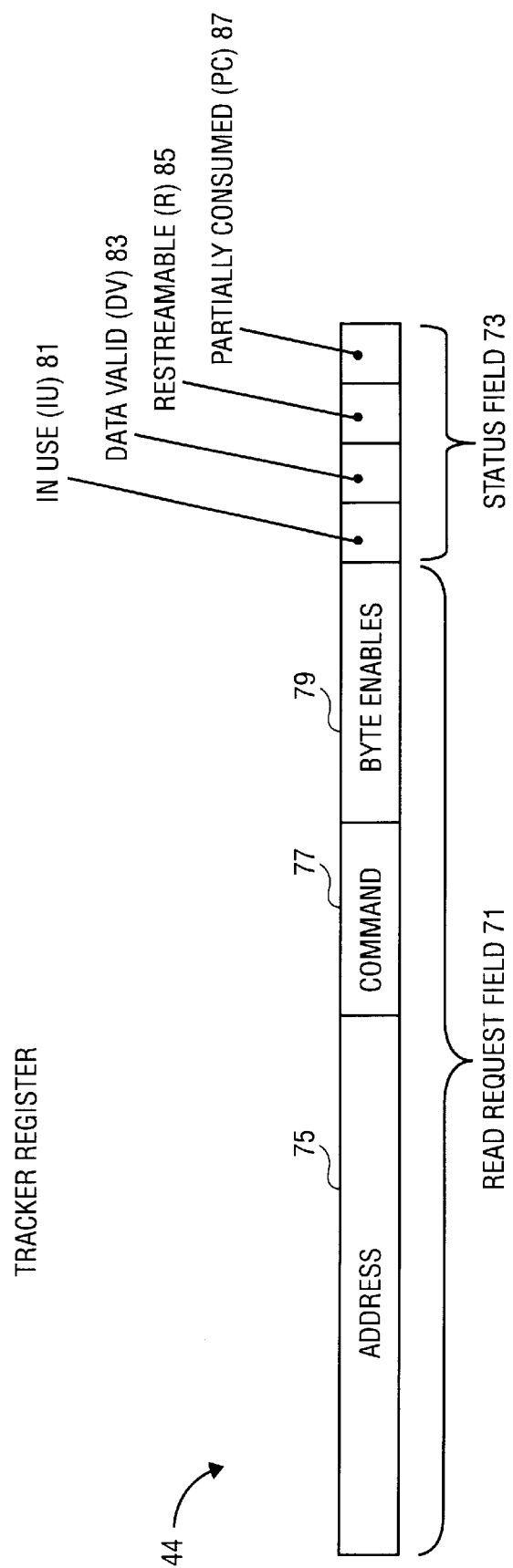
FIG. 3 illustrates the contents of a tracker register according to one embodiment.

FIG. 3 illustrates the contents of a tracker register 44 according to one embodiment. The tracker register 44 contains four fields: an address field 75, a command field 77, a byte enable field 79, and a status field 73. The address, command and byte enable fields (75, 77, 79) are referred to collectively herein as a read request field 71. The read request field 71 is filled when an inbound read request is accepted. In one embodiment, the read request field 71 is also compared with each new transaction that reaches the head of the outbound request queue to determine when the read has been completed. The read request field 71 is also compared with incoming inbound read requests to determine whether the read request is from a PCI master device that has been previously been retried (i.e., signaled to resubmit its request at a later time) and is now attempting to resubmit the same request. Thus, from one perspective, the read request field 71 is a sort of signature that identifies a given read request.

In one embodiment, the status field 73 includes four bits: an in use bit 81 (IU), a data valid bit 83 (DV), a restreamable bit 85 (R) and a partially consumed bit 87 (PC). Because the total number of states represented by these four status field bits is not necessarily equal to the total possible number of states represented by a four bit value, the same states could alternatively be indicated by less bits in a state-encoding scheme.

The IU bit 81 indicates whether the corresponding DRC queue is presently in use (IU=1) or is available for allocation to a newly received inbound read request (IU=0). In one embodiment, when the IU bit 81 in a tracker register 44 is cleared (arbitrarily chosen to be indicated by IU=0), the content of the corresponding DRC queue is considered to be invalid.

The DV bit 83 in a tracker register 44 has meaning only when the IU bit 85 is set. When IU bit 85 is set and the DV bit 83 is cleared, the data requested by an inbound read request has either (i) not yet been received in the DRC queue or (ii) has been received in the DRC queue, but the associated read completion transaction has not yet propagated to the head of the outbound transaction queue. When the data requested by an inbound read request has been received in the DRC queue and the transaction request at the head of the outbound transaction queue matches the read request field 71 of the tracker register 44 (i.e., the transaction request indicates a read completion), the DV bit 83 is set to indicate that data is valid. Until the DV bit 83 and the IU bit 81 are both set, a PCI master that is repeatedly re-submitting the same read request will be retried. After the DV bit 83 and the IU bit are set 81 (indicating that data is now available to fill a PCI master's earlier submitted read request), data is transferred to the PCI master when it next submits the read request.

The R bit 85 in the tracker register 44 is used to indicate whether prefetched data in a DRC queue may be restreamed. If a PCI master reads an initial portion of the data and then disconnects, the R bit 85 is evaluated to determine whether to allow the DRC queue to remain allocated or to invalidate the data in the DRC queue and reclaim the DRC queue for a subsequent read request. In one embodiment, if the R bit 85 is set, the DRC queue is considered to be restreamable is not reclaimed. If the R bit 85 is cleared, the data in the DRC queue is invalidated and the DRC queue is reclaimed by clearing the IU bit 81.

The PC bit 87 in the tracker register 44 is used to indicate whether a DRC queue has been streamed (i.e., partially consumed). If data has been queued in the DRC queue in response to an inbound read request, but no portion of the queued data has yet been read, the PC bit 87 is cleared to indicate that the DRC queue has not streamed. If a PCI master subsequently reads a portion of the queued data and then disconnects, the PC bit 87 is set to indicate that the DRC queue has been streamed. If the R bit 87 is cleared, then the DRC queue is reclaimed upon PCI master disconnect (and the remaining prefetched data invalidated) by clearing the IU bit 81.

Figure 4A:
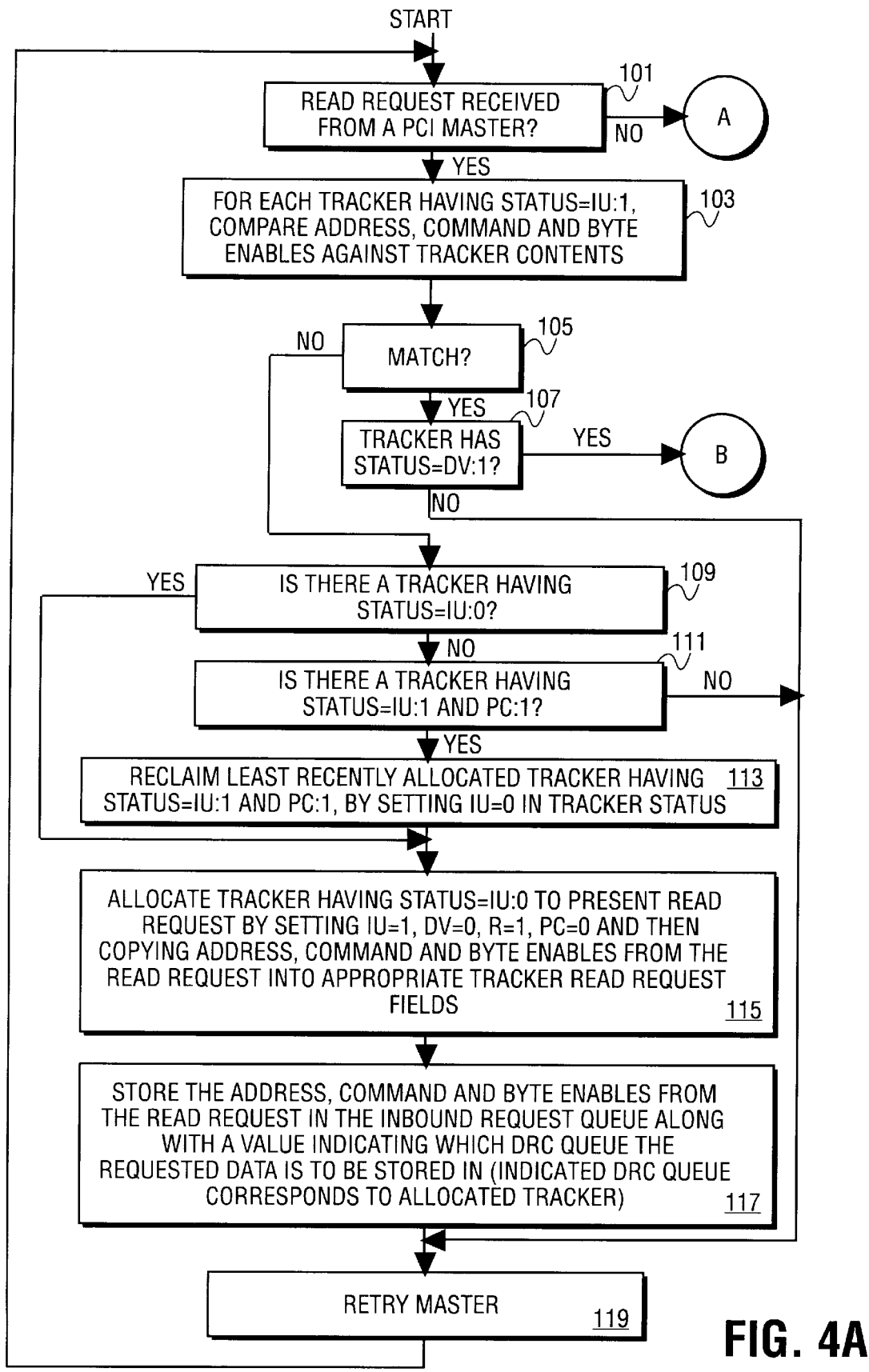
FIG. 4A is a first portion of a flow diagram that illustrates processing an inbound request according to one embodiment.
Figure 4B:
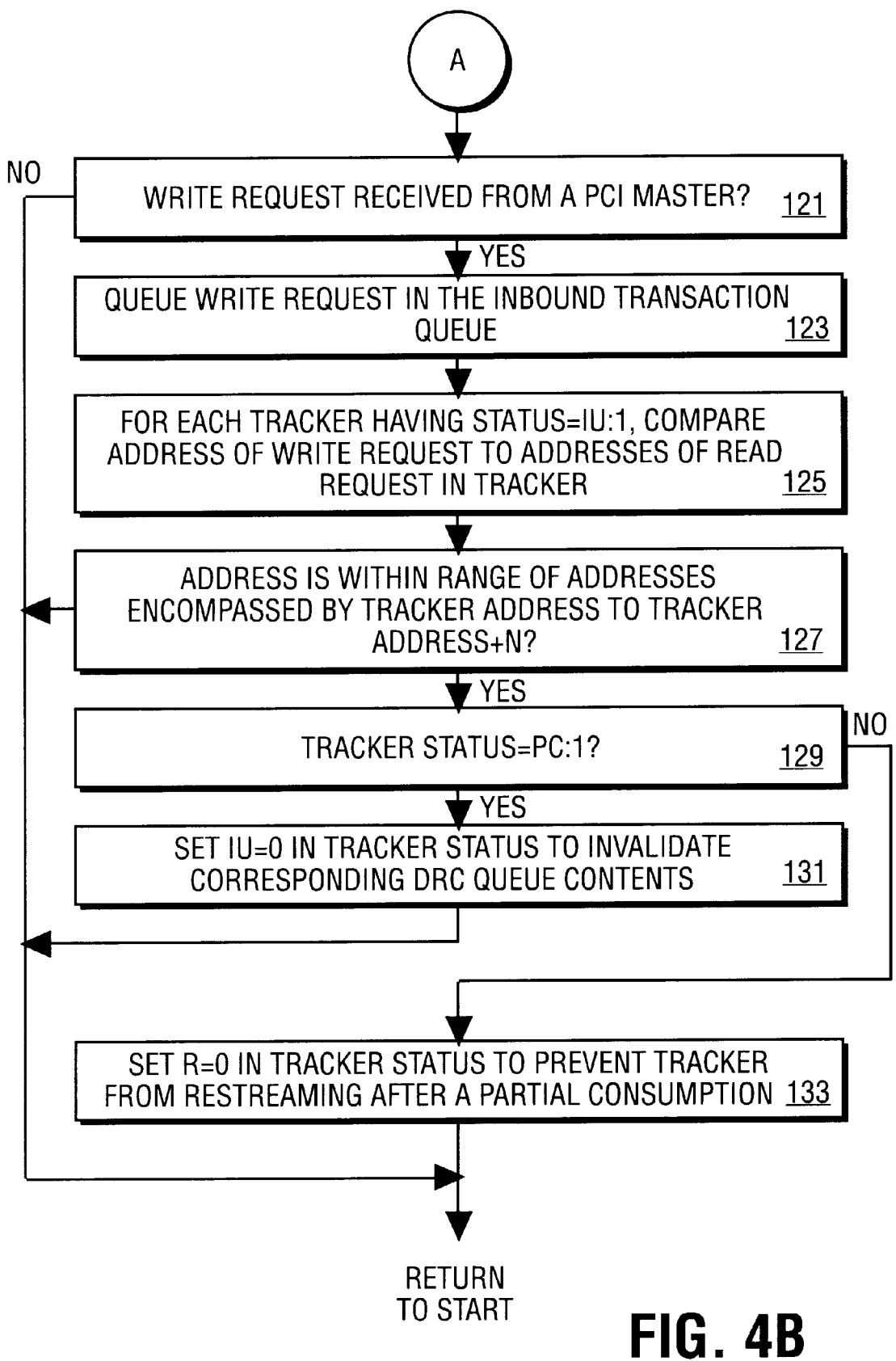
FIG. 4B is a second portion of a flow diagram that illustrates processing an inbound request according to one embodiment.
Figure 4C:
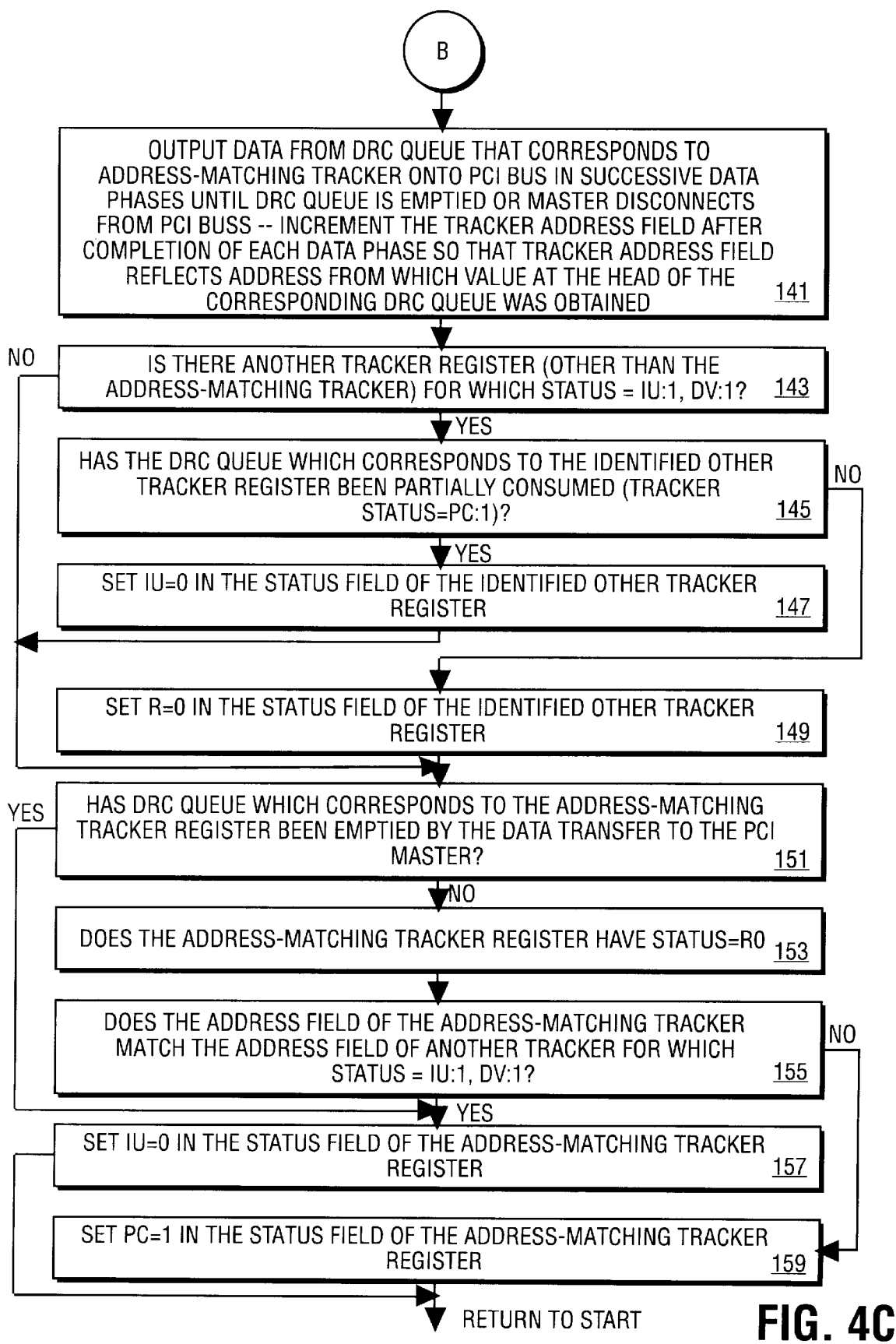
FIG. 4C is a third portion of a flow diagram that illustrates processing an inbound request according to one embodiment.

FIG. 4A, FIG. 4B and FIG. 4C are flow diagrams that illustrate the processing of an inbound request according to one embodiment. Starting with decision step 101 of FIG. 4A, inbound traffic is inspected to determine whether a read request has been received from a PCI bus master. If not, processing continues at decision step 121 of FIG. 4B. If a read request has been received from a PCI master, then at step 103 the PXB's tracker registers are inspected to determine whether there is a tracker register that contains a matching read request (i.e., does the address, command and byte enables in a tracker register's read request field match the address, command and byte enables in the incoming read request?) and that indicates the corresponding DRC queue is in use (i.e., IU bit=1 in the tracker register's status field). If a match is found at step 105, then at step 107 the tracker register's status is inspected to determine if the corresponding DRC queue contains valid data (i.e., DV bit=1). If the DRC queue does contain valid data, then processing continues at step 141 in FIG. 4C to handle the transfer of data from the DRC queue to the PCI master. If the DRC queue does not contain valid data, then the PCI master is assumed to be re-submitting an inbound read request that is already pending, but for which valid data has not yet been received (or at least, the completion transaction, if received, has not yet propagated to the head of the outbound transaction queue). Accordingly, a retry is signaled to the PCI master at step 119 so that the PCI master will re-submit the read request at a later time.

If, at decision block 105, no matching read request has been recorded in a tracker register, then the read request from the PCI master is considered to be a new read request for which a tracker register and a DRC queue need to be allocated. Thus, at step 109, the tracker registers are evaluated to determine whether there is tracker register/DRC queue pair that is not in use (IU bit=0). If so, processing continues at step 115. If a tracker register/DRC queue pair is not available, then the tracker registers are evaluated at step 113 to determine whether there is a tracker register for which the corresponding DRC queue has streamed at least once (i.e., IU=1, PC=1). If not, then all of the available DRC queues have been allocated to inbound read requests for which data has not yet streamed and the PCI master which has issued the new inbound read request is signaled to retry at step 119. If there are tracker registers for which the corresponding DRC queue has streamed, the least recently allocated one of the streamed DRC queues and its associated tracker register are reclaimed by setting the tracker register's status to IU=0. This action is consistent queue management rule 5 discussed above.

After a tracker register/DRC queue pair has been reclaimed at step 113 or found to be available at step 109, the tracker register/DRC queue pair is allocated to the present read request at step 115 by copying the address, command and byte enables from the read request into the read request fields of the tracker register and setting the tracker register's status field to indicate that the DRC queue is in use (IU=1) and restreamable (R=1), and that the DRC queue does not yet have valid data (DV=0) and has not yet streamed (PC=0). At step 117, the address, command and byte enables are stored in the inbound request queue along with a DRC queue identifier to indicate which DRC queue the requested data is to be stored in. According to one embodiment, the DRC queue identifier is determined at the time the tracker register and DRC queue are allocated in step 115. Note that, although step 117 is depicted in FIG. 4A as occurring after step 115, the operations may be performed concurrently. Note also that the command and address portion of the data copied into the tracker register and the inbound request queue are received during the address phase of the inbound read request, while the byte enables are copied into the tracker register and inbound request queue during the first data phase of the inbound read request. The byte enables are a sequence of bits (typically 4 bits for a dword transfer request and 8 bits for a qword transfer request) that indicate which byte paths of the PCI bus contain valid data during a given data phase of a transfer. During the data phase in which the byte enables are copied to the tracker register, retry is signaled to the PCI master. This is indicated by step 119.

Referring now to FIG. 4B, recall that inbound request processing continues at step 121 of FIG. 4B if an inbound request from a PCI master is not detected at step 101 of FIG. 4A. At step 121, inbound traffic is inspected to determine whether a write request has been received from a PCI bus master. If not, then inbound request processing begins again the start of FIG. 4A. If an inbound write request has been received from a PCI bus master, then the write request is queued in the inbound transaction queue at step 123. In one embodiment, an inbound write data queue is provided (not shown in FIG. 2) to hold the data to be written. Alternatively, the inbound write data may be queued behind the inbound write transaction (i.e., behind the address, command and byte enables for the write transaction) in the inbound transaction queue.

Because an inbound write request may result in updating data that has been or is being prefetched in response to an inbound read request, at decision step 127, the address targeted by the inbound write is compared against addresses in each in-use tracker register (i.e., tracker registers having status IU=1) to determine whether the inbound write address may result in updating data that has been or is being prefetched. According to one embodiment, this is accomplished by determining, for each in-use tracker register, whether the inbound write address falls within the range of addresses given by the tracker address field plus some number N, where N is the number of data values to be prefetched. In an alternate embodiment, only the M most significant bits of the inbound write address and the tracker address field are compared to determine whether they are equal. For example, by dropping the lowest 12 bits of the inbound write address and the lowest 12 bits of the address in the tracker address field before the addresses are compared, it can be determined whether the inbound write address is within the same 4K boundary as prefetched data. Other techniques may be used to determine whether an inbound write might result in updating a location from which data has been prefetched without departing from the scope of the present invention.

If, at decision step 127, the inbound write address is determined to be within a range of addresses that are to be (or have been) prefetched to an in-use DRC queue, then at step 129, the status of the tracker register for the DRC queue is evaluated to determine whether the DRC queue has streamed. If the DRC queue has streamed, then the data in the DRC queue is invalidated and the tracker register and DRC queue are reclaimed in step 131 by clearing the IU bit in the tracker register. If the DRC queue has not streamed, then the restreaming bit (the R bit) in the tracker status register is cleared in step 133 so that the DRC queue and the tracker status register will be automatically reclaimed after the first streaming of the DRC queue. The actions taken in steps 131 and 133 are consistent with DRC queue management rule 3 discussed above. After, step 131 or step 133 has been performed, processing of inbound requests begins again at the start of FIG. 4A.

Recall that processing continues at step 141 of FIG. 4C if it is determined at step 107 of FIG. 4A that an inbound read request has been received that matches an in-use tracker register's read request field and if the data in the corresponding DRC queue is valid (DV=1). In other words, FIG. 4C is the portion of the inbound request processing logic that handles an inbound read request for which valid data is present in a DRC queue. At step 141, data is output to the PCI bus from the DRC queue in successive data phases until either the DRC queue is emptied or the PCI bus master disconnects. In one embodiment, the address field of the tracker register is incremented after each data phase so that the address in the tracker register continues to indicate the address from which the value at the head of the DRC queue was obtained. In an alternate embodiment, a separate counter element in the tracker register may be provided for this purpose.

At step 143, tracker registers other than the address-matching tracking register are evaluated to determine whether their respective DRC queues are in use and have valid data (i.e., the IU and DV bits in the tracker register's status field are set). At step 145, each tracker register identified in step 143 is further evaluated to determine whether the corresponding DRC queue has streamed (i.e., whether the PC bit is set). If the corresponding DRC queue has streamed, then at step 147, the identified tracker register and corresponding DRC queue are reclaimed by clearing the IU bit in the tracker register's status field. If the DRC queue that corresponds to a tracker register identified in step 143 has not streamed, then at step 149, the restreamable bit in the tracker register's status field (i.e., the R bit) is cleared to prevent restreaming of the DRC queue after it is once streamed. The actions taken in steps 147 and 149 are consistent with DRC queue management rule 2 discussed above. The data read during step 141 is assumed to be a semaphore so that all partially consumed (i.e., streamed) DRC queues are reclaimed (step 147) and all DRC queues which contain valid data, but which have not yet streamed, are marked so that they may be streamed once, but may not be restreamed (step 147).

Returning briefly to step 149, in an alternate embodiment, a DRC queue may be marked as non-restreamable even if valid data is not yet been received in the DRC queue. In such an embodiment, when valid data is received in the DRC queue, it is allowed to stream once, then the DRC queue and corresponding tracker register are reclaimed.

If the DRC queue which corresponds to the address-matching tracker register has been emptied by the data transfer of step 141, then the address-matching tracker register and DRC queue are reclaimed at step 157 by clearing the IU bit the tracker register's status field. If the DRC queue is determined not to have been completely emptied in the data transfer of step 141, then the R bit in the address-matching tracker register is evaluated at step 151 to determine whether the DRC queue is restreamable. If the DRC queue is not restreamable (i.e., R bit=0), then the processing skips to step 157 to reclaim the address-matching tracker register and the non-restreamable DRC queue.

If, at step 153, the DRC queue is determined to be restreamable (R bit=1), then the address field of the address-matching tracker register is compared against the address field of each other in-use tracker register for which valid data has been received in the corresponding DRC queue (i.e., IU=1, DV=1). If a match is found, then the DRC queue that was streamed in step 141 has stopped at a value obtained from the same address as a value at the head of another DRC queue which has not yet streamed. Per DRC queue management rule 4, the DRC queue and address-matching tracking register are reclaimed at step 157. If no matching tracker register is identified at step 155, then the PC bit is set in the address-matching tracker register at step 159 to indicate that the corresponding DRC queue has been streamed. After step 157 or step 159 has been performed, inbound transaction processing returns to the start of FIG. 4A.

Though not specifically described in the foregoing description of the inbound processing logic or DRC queue management rules, there is at least one other circumstance in which an in-use DRC queue/tracker register pair are reclaimed. If a DRC queue has been in use for a predetermined period of time without being streamed, the DRC queue and corresponding tracker register are reclaimed for use in subsequent inbound read requests by clearing the IU bit in the tracker register's status field.

Figure 5:
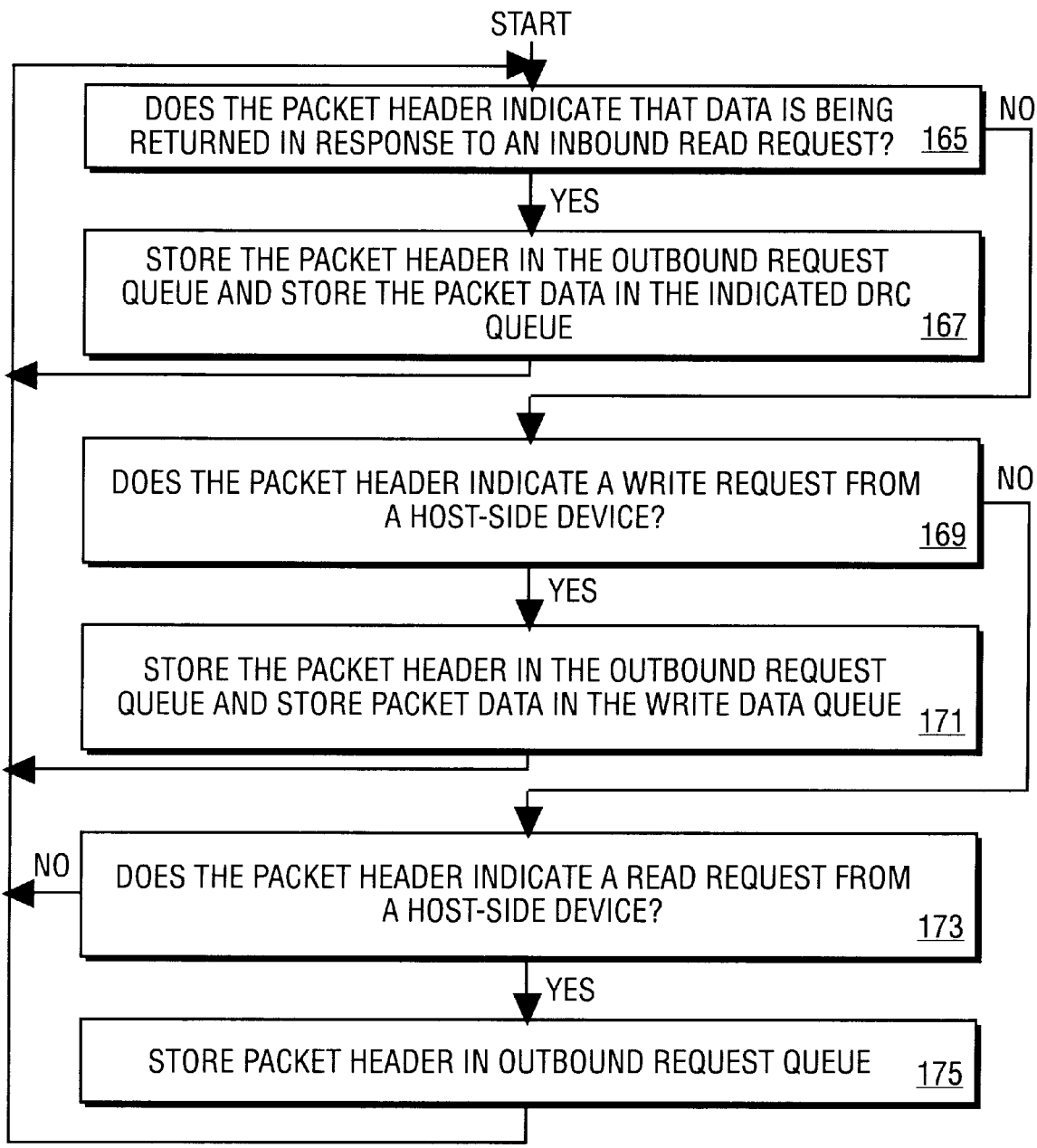
FIG. 5 is a flow diagram that illustrates one embodiment for queuing outbound transactions received from a memory/input-output controller.

FIG. 5 is a flow diagram that illustrates one embodiment for queuing outbound transactions received from the MIOC. At step 165, the header of the packet containing the outbound transaction is inspected to determine whether the transaction is a completion of a previous inbound read request. If so, then at step 167, the packet header is stripped from the packet and stored in the outbound request queue to indicate the read completion. The packet payload, which contains the requested data along with some number of prefetched data values, is stored in the DRC queue indicated by the outbound transaction. Recall that when the inbound read request was processed, a DRC queue identifier was included in the request. According to one embodiment, the DRC queue identifier is used to route the returned data into the previously allocated DRC queue. After the packet header and payload have been stored in the appropriate queues, processing begins again at the start of FIG. 5 to handle the next outbound packet.

If the packet header does not indicate a read completion at step 165, then the packet header is further evaluated at step 169 to determine whether it indicates an outbound write request. If the packet header does indicate an outbound write request, then, at step 171, the packet header is stripped from the packet and stored in the outbound transaction queue and the packet payload (i.e., the data to be written) is stored in the outbound write data queue (e.g., element 48 of FIG. 2). After the packet header and payload have been stored in the appropriate queues, processing begins again at the start of FIG. 5 to handle the next outbound packet.

If the packet header does not indicate an outbound write transaction at step 169, then the packet header is further evaluated at step 173 to determine whether it indicates an outbound read request. If the packet header does indicate an outbound read request, then the packet header is stored in the outbound transaction queue at step 175. After the packet header is stored in the outbound transaction queue, processing returns to the start of FIG. 5 to handle the next outbound packet.

Figure 6:
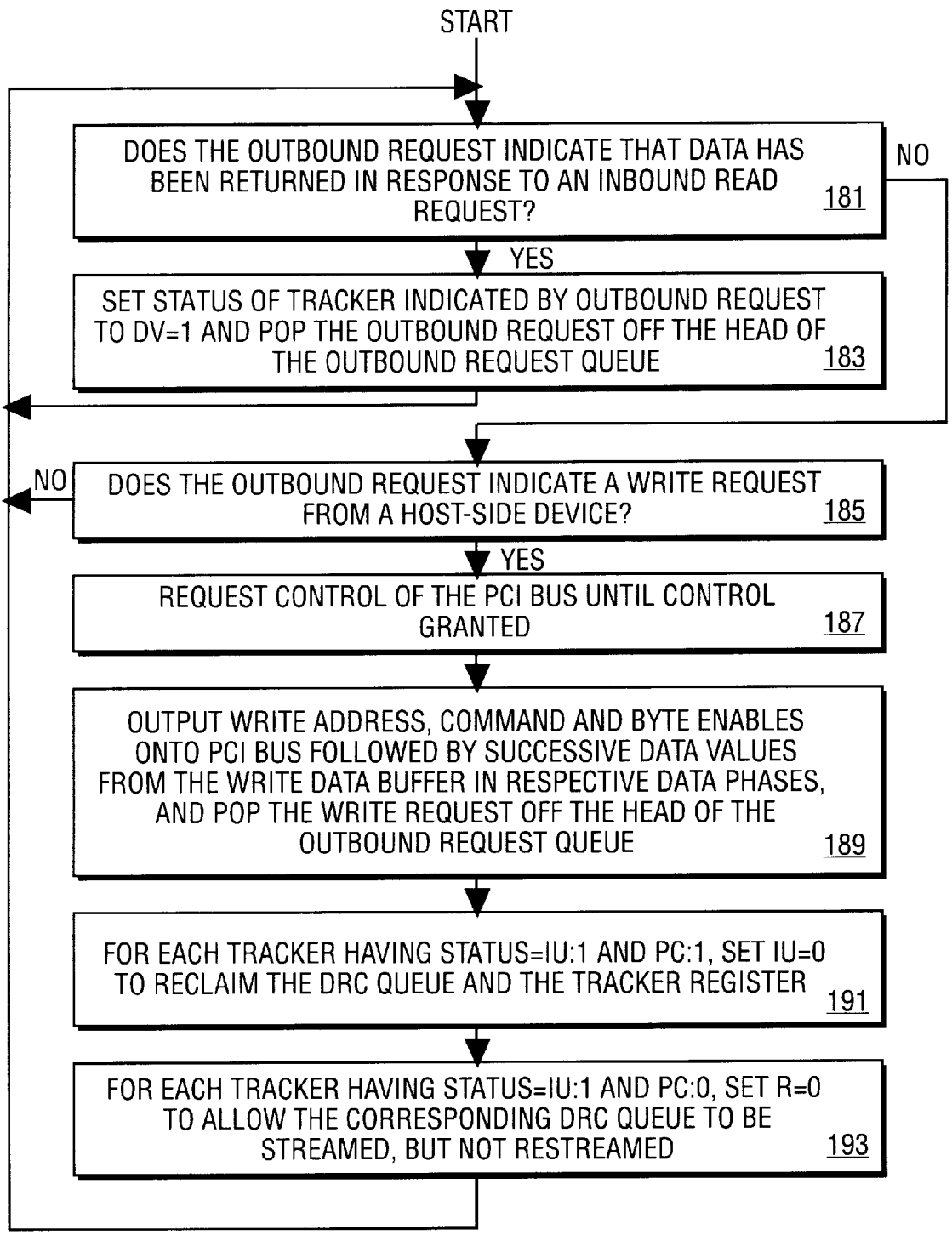
FIG. 6 is a flow diagram of one embodiment for processing an outbound transaction that has propagated to the head of an outbound request queue.

FIG. 6 is a flow diagram of one embodiment for processing an outbound transaction that has propagated to the head of the outbound request queue. At step 181, the outbound transaction at the head of the outbound request queue is evaluated to determine if it is a read completion (i.e., does the outbound transaction indicate that data has been returned in response to an inbound request?). If the outbound transaction does indicate a read completion, then at step 183, the DV bit in the status field of the tracker register indicated by the outbound transaction is set to indicate that valid data has been received and the read completion transaction is popped off the head of the outbound transaction queue. This action causes the next outbound transaction to be advanced to the head of the outbound transaction queue. Also, because the valid data bit is now set in the tracker register, when the previously retried PCI master next re-submits its inbound read request, the data will be output according to the inbound processing logic described above. When step 183 is completed, outbound transaction processing begins again at the start of FIG. 6.

If, at step 181, the outbound transaction is not determined to be a read completion transaction, then the outbound transaction is further evaluated at step 185 to determine whether it is an outbound write request. If the transaction is an outbound write request, then at step 187, the PXB requests control of the PCI bus so that it can perform the indicated write operation. When control of the PCI bus is granted, the write operation is performed at step 189 by asserting the indicated address and command during the address phase of the PCI bus transaction, and then by asserting the indicated byte enables during the successive data phases. In one embodiment, a respective data value is output to the PCI bus from the outbound write-data queue during each data phase of the outbound write transaction. Sometime before the final data phase of the PCI bus transaction is completed, the outbound write request is popped of the outbound transaction queue.

Recall from the earlier discussion of DRC queue management rule 1, that a value passed from the PBX to the PCI bus in response to an outbound write request is assumed to be a semaphore. Accordingly, at step 191, each DRC queue that has streamed at least once (i.e., IU=1 and PC=1 in the tracker register's status field) is identified and reclaimed along with the corresponding tracker register by clearing the IU bit in the tracker register's status field. Also, at step 193, each DRC queue that has not streamed but which contains valid data is prevented from restreaming by clearing the R bit in the tracker register's status field. After step 193 is completed, outbound transaction processing begins again at the start of FIG. 6.

Returning to decision step 185, if the transaction is not an outbound write request, it may be further evaluated to determine if it is an outbound read request. According to one embodiment, outbound read requests do not impact the status of DRC queues and are not of particular interest. For this reason, processing of outbound read requests is not shown in FIG. 6 nor discussed further herein. In alternate embodiments, however, it may be desirable to take certain actions during processing of an outbound read request. For example, if reading a particular I/O or memory mapped register on an expansion-side device is known to cause a change of state within the expansion-side device, it may be desirable to treat the read transaction as an outbound write by reclaiming streamed DRC queues and marking unstreamed DRC queues to be non-restreamable. Thus, an embodiment in which DRC queues are reclaimed or marked to be non-restreamable in response to outbound read requests is considered to be within the scope and spirit of the present invention.

Figure 7:
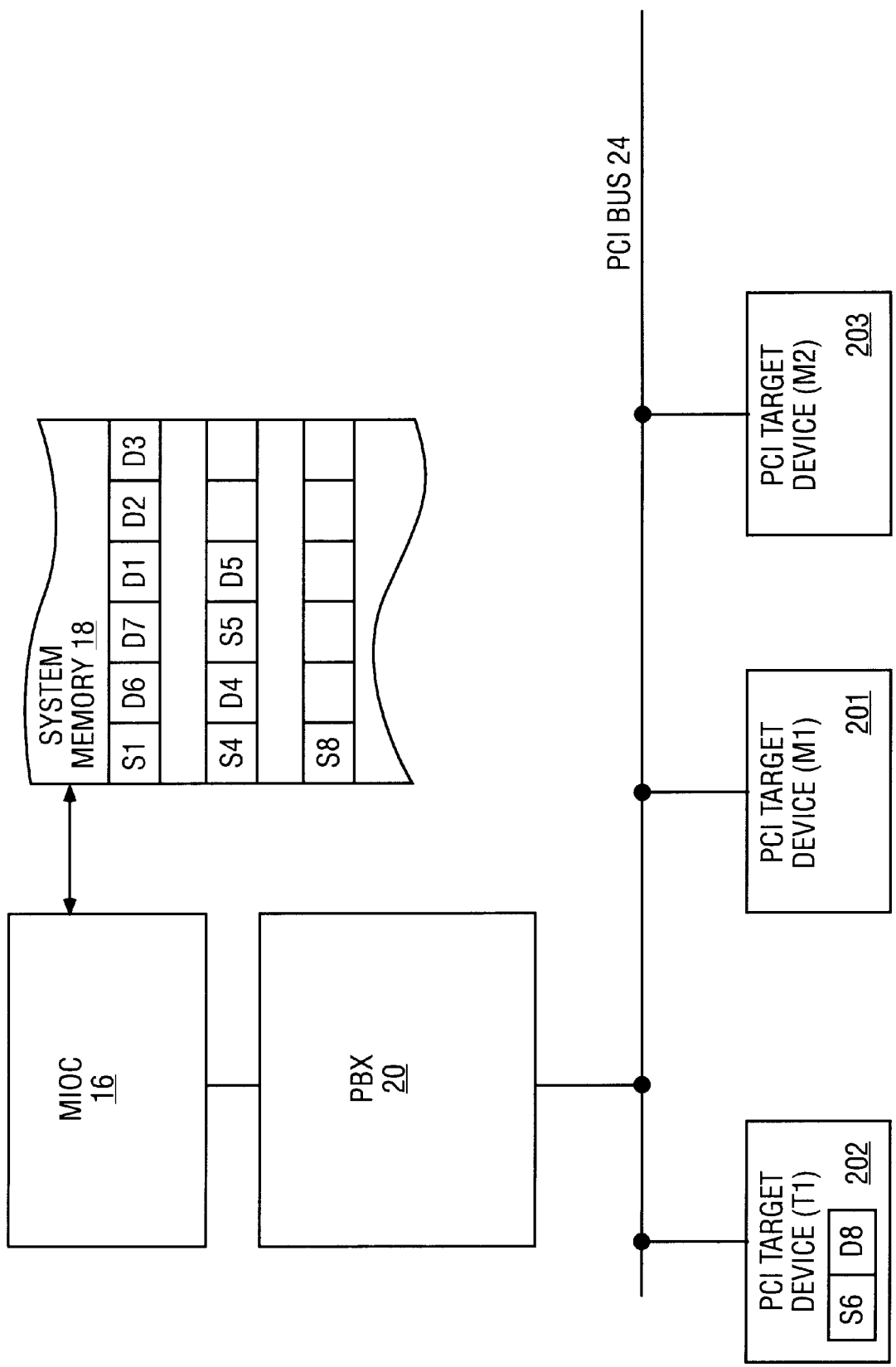
FIG. 7 illustrates an exemplary set of semaphores and data that have been distributed between a system memory a PCI bus target device.

FIG. 7 illustrates an exemplary set of semaphores and data that have been distributed between a system memory 18 and a PCI target device 202. The semaphores stored in system memory 18 are S1, S4, S5, S7 and S8, and the semaphore stored in the PCI target device 202 is S6. Semaphore S1 is meant to control access to data values D1, D2 and D3, semaphore S4 is meant to control access to data value D4, semaphore S5 is meant to control access to data value D5, semaphore S6 is meant to control access to data value D6 and D7 and semaphore S8 is meant to control access to data value D8. Except for data value D8, which is located in the PCI target device 202, all of the data values are located in the system memory 18. As with the embodiment shown in FIG. 2, the MIOC 16 and the PBX 20 are used to establish the transfer path between the system memory 18 and the PCI master devices 201 and 203 that are connected to PCI bus 24. Although the PCI target device 202 is depicted in FIG. 7 as being distinct from the PCI master devices 201 and 203, the PCI target device 202 may, in various embodiments, be located within either of the PCI master devices 201 and 203.

Supposing now that the PCI master device 201 ("M1") initiates a read transaction to obtain semaphore S1 (ostensibly, for the purpose of determining whether D1, D2 and D3 may be accessed). The read transaction is accepted as an inbound read request in the PBX which retries M1 while the requested data is obtained. Because the PBX does not know exactly how much data is sought by M1, the PBX prefetches at least S1, D6, D7, D1, D2 and D3. As an aside, there are three different memory read commands supported by the current PCI bus specification (i.e., "PCI Local Bus Specification" Revision 2.1, published Jun. 1, 1995 by the PCI SIG), Memory Read, Memory Read Line and Memory Read Multiple. According to one embodiment, when a Memory Read command is received, the PBX prefetches data starting at the address which follows the address of the requested data value and continuing to the end of the same cache line. If a Memory Read Line command is received, the PBX prefetches the same data as in response to the Memory Read command, plus the complete successive cache line. If a Memory Read Multiple command is received, the PBX prefetches the same data as in response to the Memory Read Command, plus a predetermined number of successive cache lines. Thus, while the request to read S1 is described as prefetching values D6, D7, D1, D2 and D3, in actuality, significantly more data will typically be prefetched.

Figure 8:
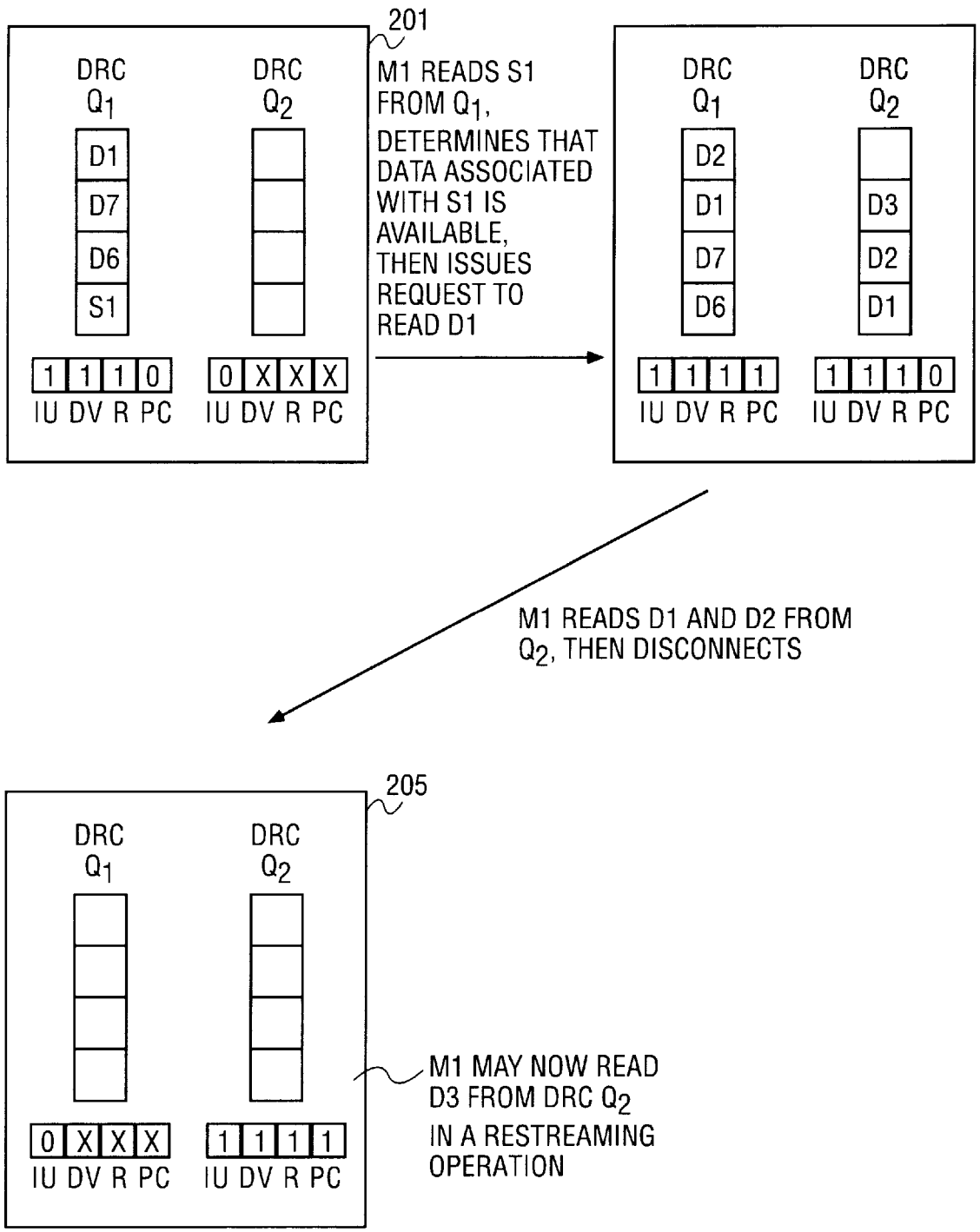
FIG. 8 illustrates the progression of the states of read completion queues in response to transactions performed in the system of FIG. 7.

FIG. 8 illustrates the progression of the state of DRC queues 1 and 2 (Q1 and Q2) as transactions take place in the system of FIG. 7. Box 201 depicts the state of Q1 and its associated status field (the "Q1 status") after data becomes valid in Q1, starting with S1. Thus, Q1 is in use with valid, restreamable data, which has not yet streamed. This is indicated by the Q1 status IU=1, DV=1, R=1, PC=0. Q2 is not in use as indicated by the Q2 status IU=0. Because Q2 is not in use, the states of the DV, R and PC bits are meaningless and indicated to be X (don't care).

Assume now that the following sequence of events takes place: M1 (the PCI master 201 of FIG. 7) reads S1 from Q1, M1 disconnects to evaluate S1, M1 determines from S1 that data values D1, D2 and D3 are available and M1 then issues a request to read D1 (M1 may actually want to read D1, D2 and D3, but it will be retried during the first data phase— before D2 and D3 are requested). Box 203 shows the states of Q1 and Q2 after D1 has been returned (along with prefetched D2 and D3) and determined to be valid. Because Q1 has been streamed to output S1, the contents of Q1 have been advanced and the Q1 status now indicates partial consumption (PC=1). Note that Q1 has not been reclaimed because the PBX has not yet ruled out the possibility that Q1 may be restreamed. This is significant because if a PCI bus master (M1 or M2) now requests to read data beginning at D6, Q1 may be restreamed without a request to read D6 crossing the bridge. By contrast, in prior-art devices which invalidate a prefetch queue after a master disconnects, the data in Q1 would have been invalidated after M1 disconnected and D6 and any other prefetched data in Q1 would be lost.

Still referring to box 203, the Q2 status indicates that Q2 contains valid, restreamable data that has not yet been streamed. Box 205 shows the states of Q1 and Q2 after M1 reads D1 and D2 (thereby causing Q2 to stream) and then disconnects. Because Q1 had been partially consumed when Q2 streamed, Q1 is reclaimed by clearing the IU status bit (DRC queue management rule 2). This action invalidates the data in Q1. Q2 is now indicated to be partially consumed, but remains restreamable. Again, in a prior art device which invalidates a prefetch queue after a PCI master disconnects, the contents of Q2 would be lost when M1 disconnects. As shown in FIG. 8, however, in embodiments of the present invention a prefetch queue is invalidated only in response to well-defined events, thereby enabling a prefetch queue to be restreamed even after a bus master disconnects. Thus, M1 is able to read D3 from Q2 in a restreaming operation. Additional restreaming of Q2 may be performed until Q2 is emptied or until an event requiring reclamation of Q2 occurs.

Figure 9:
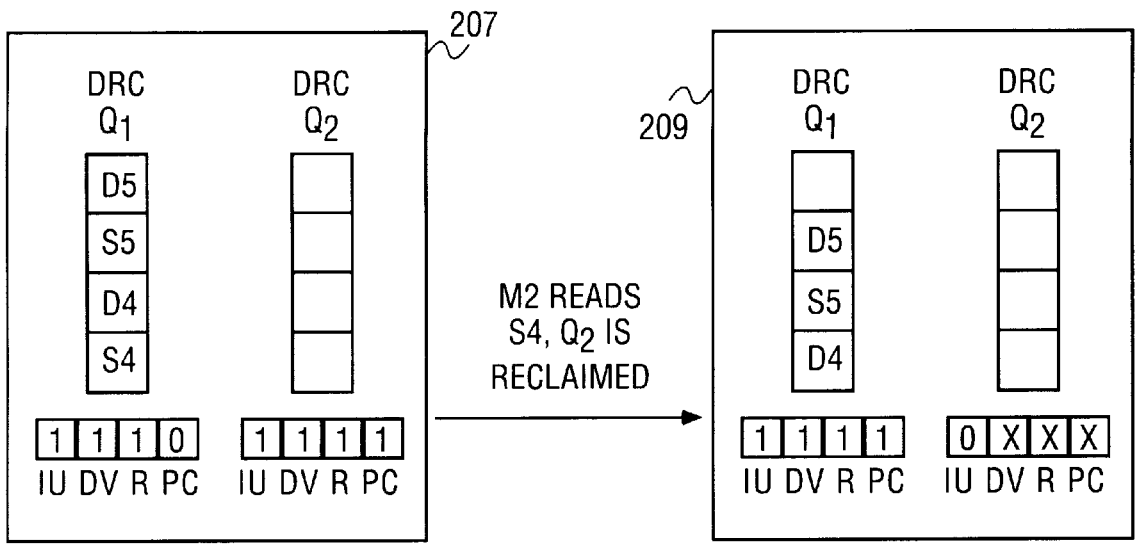
FIG. 9 further illustrates the progression of the states of read completion queues in response to transactions performed in the system of FIG. 7.

FIG. 9 illustrates the progression of the states of Q1 and Q2 in response to a different set of transactions. Assume that Q1 and Q2 are initially in the states shown in box 203 of FIG. 8 and that M2 issues a request to read S4. Assume further that sometime before S4 is streamed to M2, M1 reads D1 and D2 and then disconnects. After S4 becomes valid in Q1, the states of Q1 and Q2 are as shown in box 207. If M2 now reads S4 from Q1 before M1 attempts to read D3, Q2 will be reclaimed and data D3 will be lost as shown by box 209. This is an application of DRC queue management rule 2. Because the PBX assumes that S4 may be a semaphore bearing on D3, the PBX invalidates the contents of Q2 when Q1 streams.

Figure 10:
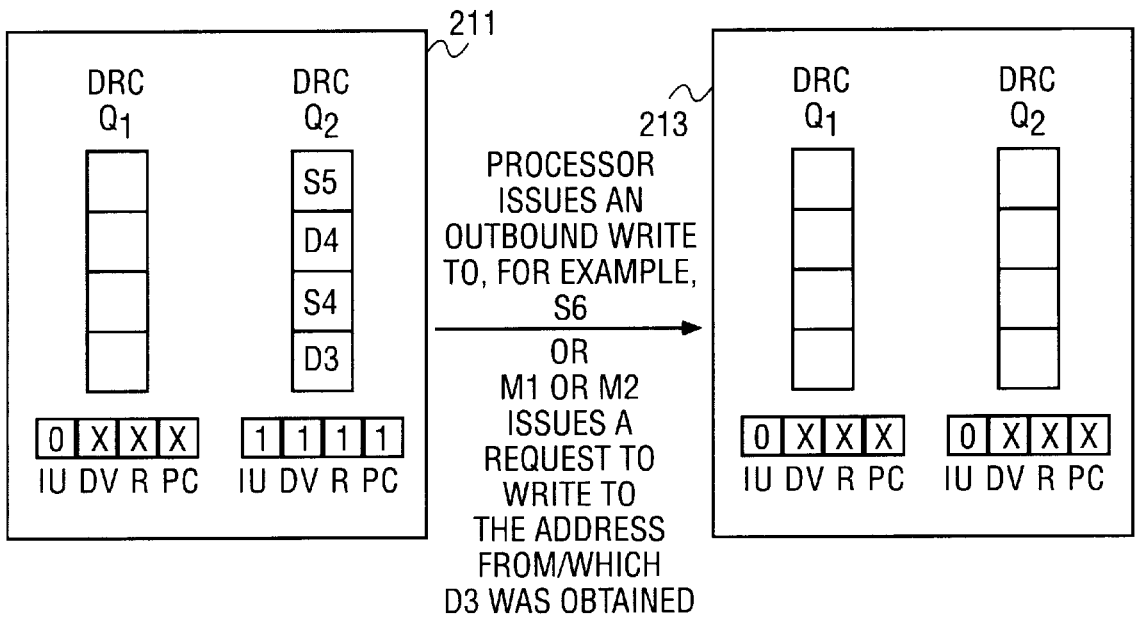
FIG. 10 illustrates the progression of the states of read completion queues in response to outbound and inbound write transactions.

FIG. 10 illustrates the progression of the states of Q1 and Q2 in response to outbound and inbound write transactions. Assume that Q1 and Q2 are initially in the states shown in box 211. That is, Q1 is available, Q2 is in use and has been streamed and D3 is present at the head of Q2. If an outbound write transaction is now processed and results in a value passing from the host-side of the PXB to the PCI bus, the value is assumed to be a semaphore bearing on D3. Consequently Q2 is reclaimed and D3 and other prefetched data therein is invalidated. This is shown by box 213. If, instead of an outbound write transaction, an inbound write transaction is received that requests a value to be written to an address from which prefetched data in Q2 has been obtained, Q2 is reclaimed and the prefetched data therein is invalidated.

Figure 11:
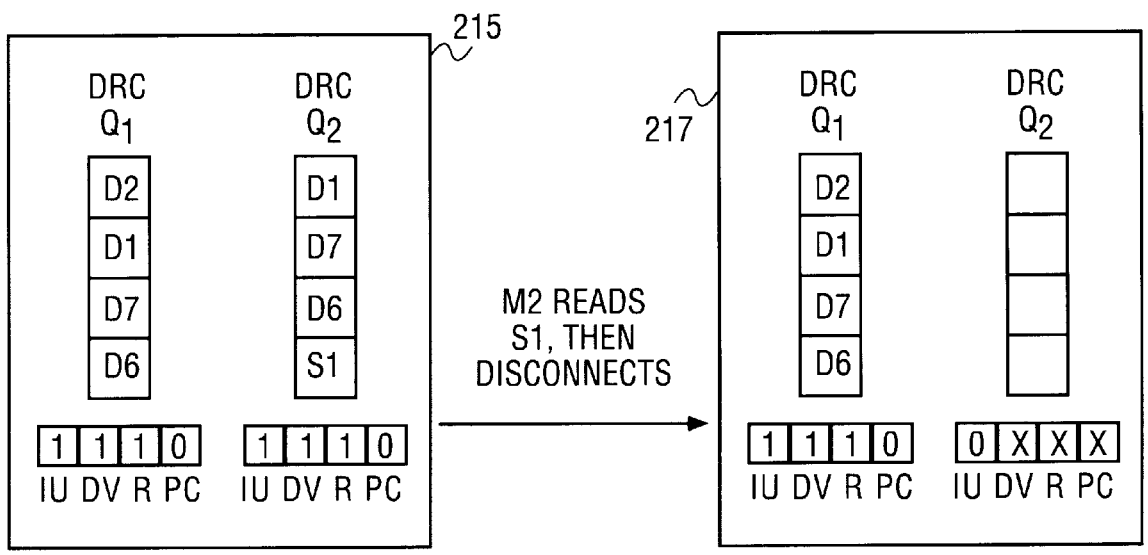
FIG. 11 illustrates progression of the states of read completion queues in response to a transaction that causes values from the same address to be present at the respective heads of the read completion queues.

FIG. 11 illustrates progression of the states of Q1 and Q2 in response to a transaction that causes values from the same address to be present at the respective heads of Q1 and Q2. Assume that Q1 and Q2 are initially in the states shown in box 215. That is, Q1 and Q2 each are in use with valid, restreamable data that has not yet streamed. If M1 now reads S1 and then disconnects, D6 will be present at the heads of both Q1 and Q2. Note that the value of D6 may actually be different due to the fact that D6 has been acquired from system memory and placed into Q1 and Q2 in separate transactions. According to one embodiment, Q2 is invalidated to avoid having two instances of D6 at the heads of different DRC queues. This is shown by box 217. One reason for invalidating Q2 instead of Q1 is that the DRC queue which has not yet streamed (Q1) should be available to stream at least once. By contrast, the DRC queue which has already streamed (Q2) may be reclaimed at any time. Thus, in a choice between invalidating a queue that is, for the most part, guaranteed to be available for streaming and a queue that may or may not be available for streaming, the queue least likely to be available is probably the best candidate for invalidation. Hence, DRC queue management rule 5. In an alternate embodiment, the determination of which DRC queue to discard could be made on the fly based on various criteria including the number of times a DRC queue has been restreamed and the frequency with which the DRC queue has been restreamed, and so forth.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising the steps of:
   storing data received via a first bus in a first queue;
   outputting a first portion of the data in the first queue to a second bus, a second portion of the data remaining in the first queue when a bus master device coupled to the second bus relinquishes control of the second bus; and
   invalidating the second portion of the data in the first queue in response to another data value being transferred from the first bus to the second bus before the second portion of the data is output to the second bus in response to the bus master device regaining control of the second bus and requesting the second portion of the data to be output to the second bus.

2. The method of claim 1 further comprising the step of invalidating the second portion of the data in the first queue in response to a data value being transferred from the second bus to the first bus if the data value transferred from the second bus to the first bus is destined for a memory address from which at least one value of the second portion of the data in the first queue was obtained.

3. The method of claim 1 further comprising the step of storing in a first register associated with the first queue a status value indicating a state of the data in the first queue, and wherein the step of invalidating the second portion of the data in the first queue includes the step of setting the status value in the first register to indicate that the second portion of the data is invalid.

4. The method of claim 3 wherein the step of setting the status value in the first register to indicate that the second portion of the data is invalid includes the step of setting the status value to indicate that the first queue is available to receive data.

5. The method of claim 1 further comprising the steps of:
   receiving a request from the bus master device coupled to the second bus to read a memory device via the second bus;
   issuing a command to the bus master device to relinquish control of the second bus while the request is pending;
   accessing the memory device to obtain the data stored in the first queue in said step of storing data; and
   signaling the bus master device to read at least a portion of the data stored in the first queue.

6. The method of claim 1 further comprising the step of the bus master device on the second bus requesting that output of the data in the first queue to the second bus be stopped after the first portion of the data is output to the second bus.

7. The method of claim 6 further comprising the steps of:
   receiving a request from the bus master device to output the second portion of the data in the first queue to the second bus; and
   outputting the second portion of the data to the second bus if another data value is not transferred from the first bus to the second bus after said step of storing data and prior to said step of receiving a request to output the second portion of the data and if, after said step of storing data and prior to said step of receiving a request, another data value is not transferred from the second bus to the first bus in response to a request to write to an address from which at least one value of the second portion of the data in the first queue was obtained.

8. The method of claim 1 further comprising invalidating the second portion of the data in the first queue in response to the data in the second portion of the first queue having a data value at a head of the second portion that was received via the first bus from the same address as a data value at a head of a second queue of which no portion has been output to the second bus.

9. The method of claim 1 further comprising invalidating the second portion of the data in the first queue if the first queue is a least recently allocated queue among a plurality of queues comprising data, a portion of which has been output to the second bus.

10. An apparatus for transferring data between a first bus and a second bus, the apparatus comprising:
   a first queue coupled to the first bus and the second bus to hold data received from the first bus in response to a memory read operation requested via the second bus;
   a first register associated with the first queue and including one or more status bits indicating whether the first queue contains valid data; and control logic coupled to the first bus, second bus and first register, the control logic setting the one or more status bits to indicate that a remaining portion of the data in the first queue is invalid in response to detecting a data value being transferred from the first bus to the second bus after an initial portion of the data in the first queue is output to the second bus to a bus master device coupled to the second bus that subsequently relinquished the second bus and before the remaining portion of the data in the first queue is output to the second bus in response to the bus master device having regained control of the second bus and requesting the remaining portion.

11. The apparatus of claim 10 wherein the second bus is a peripheral component interconnect (PCI) bus.

12. The apparatus of claim 10 wherein the control logic also sets the one or more status bits to indicate that a remaining portion of the data in the first queue is invalid in response to detecting a data value being transferred from the second bus to the first bus if the data value transferred from the second bus to the first bus is destined for a memory address from which at least one value of the second portion of the data in the first queue was obtained.

13. The apparatus of claim 10 wherein the one or more status bits indicate whether or not the first queue is reserved to support a previously requested data transfer.

14. The apparatus of claim 10 wherein the control logic is configured to set the one or more status bits to indicate that a remaining portion of the data in the first queue is invalid in response to the data in the second portion of the first queue having a data value at a head of the second portion that was received via the first bus from the same address as a data value at a head of a second queue of which no portion has been output to the second bus.

15. The apparatus of claim 10 wherein the control logic is configured to set the one or more status bits to indicate that a remaining portion of the data in the first queue is invalid if the first queue is a least recently allocated queue among a plurality of queues comprising data, a portion of which has been output to the second bus.

16. An apparatus comprising:
storing data received via a first bus in a first queue;
outputting a first portion of the data in the first queue to a second bus, a second portion of the data remaining in the first queue when a bus master device coupled to the second bus relinquishes control of the second bus; and
invalidating the second portion of the data in the first queue in response to another data value being transferred from the first bus to the second bus before the second portion of the data is output to the second bus in response to the bus master device requesting the second portion of the data to be output to the second bus.

17. The apparatus of claim 16 further comprising means for invalidating the second portion of the data in the first queue in response to a data value being transferred from the second bus to the first bus if the data value transferred from the second bus to the first bus is destined for a memory address from which at least one value of the second portion of the data in the first queue was obtained.

18. The apparatus of claim 16 further comprising means for invalidating the second portion of the data in the first queue in response to the data in the second portion of the first queue having a data value at a head of the second portion that was received via the first bus from the same address as a data value at a head of a second queue of which no portion has been output to the second bus.

19. The apparatus of claim 16 further comprising means for invalidating the second portion of the data in the first queue if the first queue is a least recently allocated queue among a plurality of queues comprising data, a portion of which has been output to the second bus.

20. A bus bridging device comprising:
request processing logic to store data received via a first bus in a first queue;
bridge control logic to output a first portion of the data in the first queue to a second bus, a second portion of the data remaining in the first queue when a bus master device coupled to the second bus relinquishes control of the second bus; and
queue management logic to invalidate the second portion of the data in the first queue in response to another data value being transferred from the first bus to the second bus before the second portion of the data is output to the second bus in response to the bus master device regaining control of the second bus and requesting the second portion of the data to be output to the second bus.

21. The bus bridging device of claim 20 further comprising queue reclamation logic to invalidate the second portion of the data in the first queue in response to a data value being transferred from the second bus to the first bus if the data value transferred from the second bus to the first bus is destined for a memory address from which at least one value of the second portion of the data in the first queue was obtained.

22. The bus bridging device of claim 20 further comprising queue reclamation logic configured to invalidate the second portion of the data in the first queue in response to the data in the second portion of the first queue having a data value at a head of the second portion that was received via the first bus from the same address as a data value at a head of a second queue of which no portion has been output to the second bus.

23. The bus bridging device of claim 20 further comprising queue reclamation logic configured to invalidate the second portion of the data in the first queue if the first queue is a least recently allocated queue among a plurality of queues comprising data, a portion of which has been output to the second bus.

24. A computer system comprising:
a first bus;
a plurality of processors coupled to the first bus;
a system memory coupled to the first bus;
a second bus;
a bus master device coupled to the second bus; and
a bus bridging device coupled to the first bus and the second bus to communicate transaction requests and data there between, the bus bridging device including;
a first queue coupled to the first bus and the second bus to hold data received from the first bus in response to a memory read operation requested via the second bus;
a first register associated with the first queue and including one or more status bits indicating whether the first queue contains valid data; and
control logic coupled to the first bus, second bus and first register, the control logic setting the one or more status bits to indicate that a remaining portion of the data in the first queue is invalid in response to detecting a data value being transferred from the first bus to the second bus after an initial portion of the data in the first queue is output to the second bus to a bus master device coupled to the second bus that subsequently relinquished the second bus and before the remaining portion of the data in the first queue is output to the second bus in response to the bus master device having regained control of the second bus and requesting the remaining portion.

25. The computer system of claim 24 wherein the control logic also sets the one or more status bits to indicate that a remaining portion of the data in the first queue is invalid in response to detecting a data value being transferred from the second bus to the first bus if the data value transferred from the second bus to the first bus is destined for a location in the system memory from which at least one value of the second portion of the data in the first queue was obtained.

26. The computer system of claim 24 wherein the system memory is coupled to the first bus via a device via a memory controller, the system memory being coupled to the memory controller via a memory bus.

27. The computer system of claim 26 wherein the one or more status bits indicate whether or not the first queue is reserved to support a previously requested data transfer.

28. The computer system of claim 24 wherein the control logic is configured to set the one or more status bits to indicate that a remaining portion of the data in the first queue is invalid in response to the data in the second portion of the first queue having a data value at a head of the second portion that was received via the first bus from the same address as a data value at a head of a second queue of which no portion has been output to the second bus.

29. The computer system of claim 24 wherein the control logic is configured to set the one or more status bits to indicate that a remaining portion of the data in the first queue is invalid if the first queue is a least recently allocated queue among a plurality of queues comprising data, a portion of which has been output to the second bus.

30. A computer system comprising:
   a first bus;
   a processor coupled to the first bus;
   a system memory coupled to the first bus;
   a second bus;
   a bus master device coupled to the second bus; and
   a bus bridging device coupled to the first bus and the second bus to communicate transaction requests and data therebetween, the bus bridging device including from the first bus in response to a memory read operation requested via the second bus;
   a first register associated with the first queue and including one or more status bits indicating whether the first queue contains valid data; and
   control logic coupled to the first bus, second bus and first register, the control logic setting the one or more status bits to indicate that a remaining portion of the data in the first queue is invalid in response to detecting a data value being transferred from the first bus to the second bus after an initial portion of the data in the first queue is output to the second bus to a bus master device coupled to the second bus that subsequently relinquished the second bus and before the remaining portion of the data in the first queue is output to the second bus in response to the bus master device having regained control of the second bus and requesting the remaining portion.

31. The computer system of claim 30 wherein the control logic also sets the one or more status bits to indicate that a remaining portion of the data in the first queue is invalid in response to detecting a data value being transferred from the second bus to the first bus if the data value transferred from the second bus to the first bus is destined for a location in the system memory from which at least one value of the second portion of the data in the first queue was obtained.

32. The computer system of claim 30 wherein the control logic is configured to set the one or more status bits to indicate that a remaining portion of the data in the first queue is invalid in response to the data in the second portion of the first queue having a data value at a head of the second portion that was received via the first bus from the same address as a data value at a head of a second queue of which no portion has been output to the second bus.

33. The computer system of claim 30 wherein the control logic is configured to set the one or more status bits to indicate that a remaining portion of the data in the first queue is invalid if the first queue is a least recently allocated queue among a plurality of queues comprising data, a portion of which has been output to the second bus.

34. A method comprising:
   storing data received via a first bus in a first queue; and
   prior to outputting the data in the first queue to a second bus, marking the data in the first queue, if a data value is transferred from the first bus to the second bus before any portion of the data in the first queue is output to the second bus, as valid for a single output operation such that the data in the first queue can be output to the second bus once in response to a single request for the output of that data, and any portion of the data that has not been output during that output operation will be invalidated upon completion of that output operation.

35. The method of claim 34 further comprising marking the data in the first queue as valid for a single output operation in response to a data value being transferred from the second bus to the first bus if the data value transferred from the second bus to the first bus is destined for a memory address from which at least one value of the data in the first queue was obtained.

36. The method of claim 34 further comprising marking the data in the first queue as valid for a single output operation in response to the data in the second portion of the first queue having a data value at a head of the second portion that was received via the first bus from the same address as a data value at a head of a second queue of which no portion has been output to the second bus.

37. The method of claim 34 further comprising marking the data in the first queue as valid for a single output operation if the first queue is a least recently allocated queue among a plurality of queues comprising data, a portion of which has been output to the second bus.

38. The method of claim 34 further comprising:
   storing in a first register associated with the first queue a status value indicating a state of the data in the first queue; and
   marking the data in the first queue as valid for a single output operation or invalidating any portion of the data in the first queue that has not been output in response to the single request by setting a status value in the first register.

39. The method of claim 38 wherein setting a status value in the first register to indicate that any portion of the data in the first queue that has not been output in response to the single request is invalid includes setting the status value to indicate that the first queue is available to receive data.

40. An apparatus for transferring data between a first bus and a second bus, the apparatus comprising:
   first queue coupled to the first bus and the second bus to store data received from the first bus in response to a memory read operation requested via the second bus;

a first register associated with the first queue and including at least one status bit configured to indicate whether the data in the first queue is valid for a single output operation such that the data in the first queue can be output to the second bus once in response to a single request for the output of that data, and any portion of the data that has not been output in response to the single request will be invalidated upon completion of that output operation; and control logic coupled to the first bus, second bus and first register, the control logic being configured to set the at least one status bit to indicate that any portion of the data in the first queue that is not output in response to the single request will be invalid in response to detecting the transfer of a data value from the first bus to the second bus before any portion of the data in the first queue is output to the second bus.

41. The apparatus of claim 40 wherein the control logic is configured to set the at least one status bit to indicate that the data in the first queue is valid for a single output operation in response to detecting the transfer of a data value from the second bus to the first bus if the data value transferred from the second bus to the first bus is destined for a memory address from which at least one value in the data in the first queue was obtained.

42. The apparatus of claim 40 wherein the at least one status bit indicates whether or not the first queue is reserved to support a previously requested data transfer.

43. The apparatus of claim 40 wherein the control logic is configured to set the at least one status bit to indicate that the data in the first queue is valid for a single output operation in response to the data in the second portion of the first queue having a data value at a head of the second portion that was received via the first bus from the same address as a data value at a head of a second queue of which no portion has been output to the second bus.

44. The apparatus of claim 40 wherein the control logic is configured to set the at least one status bit to indicate that the data in the first queue is valid for a single output operation if the first queue is a least recently allocated queue among a plurality of queues comprising data, a portion of which has been output to the second bus.

45. An apparatus comprising:
means for storing data received via a first bus in a first queue; and
means for marking the data in the first queue, prior to outputting data in the first queue to a second bus and if a data value is transferred from the first bus to the second bus before any portion of the data in the first queue is output to the second bus, as valid for a single output operation such that the data in the first queue can be output to the second bus once in response to a single request for the output of that data, and any portion of the data that has not been output during that output operation will be invalidated upon completion of that output operation.

46. The apparatus of claim 45 further comprising means for marking the data in the first queue as valid for a single output operation in response to a data value being transferred from the second bus to the first bus if the data value transferred from the second bus to the first bus is destined for a memory address from which at least one value of the data in the first queue was obtained.

47. The apparatus of claim 45 further comprising means for marking the data in the first queue as valid for a single output operation in response to the data in the second portion of the first queue having a data value at a head of the second portion that was received via the first bus from the same address as a data value at a head of a second queue of which no portion has been output to the second bus.

48. The apparatus of claim 45 further comprising means for marking the data in the first queue as valid for a single output operation if the first queue is a least recently allocated queue among a plurality of queues comprising data, a portion of which has been output to the second bus.

49. A bus bridging device comprising:
request processing logic configured to store data received via a first bus in a first queue;
queue management logic configured to mark the data in the first queue, prior to outputting data in the first queue to a second bus and if a data value is transferred from the first bus to the second bus before any portion of the data in the first queue is output to the second bus, as valid for a single output operation such that the data in the first queue can be output to the second bus once in response to a single request for the output of that data, and any portion of the data that has not been output during that output operation will be invalidated upon completion of that output operation.

50. The bus bridging device of claim 49 further comprising queue reclamation logic configured to mark the data in the first queue as valid for a single output operation in response to a data value being transferred from the second bus to the first bus if the data value transferred from the second bus to the first bus is destined for a memory address from which at least one value of the data in the first queue was obtained.

51. The bus bridging device of claim 49 further comprising queue reclamation logic configured to mark the data in the first queue as valid for a single output operation in response to the data in the second portion of the first queue having a data value at a head of the second portion that was received via the first bus from the same address as a data value at a head of a second queue of which no portion has been output to the second bus.

52. The bus bridging device of claim 49 further comprising queue reclamation logic configured to mark the data in the first queue as valid for a single output operation if the first queue is a least recently allocated queue among a plurality of queues comprising data, a portion of which has been output to the second bus.

53. A computer system comprising:
a first bus;
a system memory coupled to the first bus;
a second bus;
a bus master device coupled to the second bus; and
a bus bridging device coupled to the first bus and the second bus and configured to communicate transaction requests and data therebetween, the bus bridging device including
a first queue coupled to the first bus and the second bus and configured to store data received from the first bus in response to a memory read operation requested via the second bus;
a first register associated with the first queue and including at least one status bit indicating whether the data in the first queue is valid for a single output operation such that the data in the first queue can be output to the second bus once in response to a single request for the output of that data, and any portion of the data that has not been output during that output operation will be invalidated upon completion of that output operation; and control logic coupled to the first bus, second bus and first register, the control logic being configured to set the at least one status bit to indicate that any portion of the data in the first queue that is not output in response to the single request will be invalid in response to detecting the transfer of a data value from the first bus to the second bus before any portion of the data in the first queue is output to the second bus.

54. The computer system of claim 53 wherein the control logic is configured to set the at least one status bit to indicate that the data in the first queue is valid for a single output operation in response to detecting a data value being transferred from the second bus to the first bus if the data value transferred from the second bus to the first bus is destined for a memory address from which at least one value in the data in the first queue was obtained.

55. The computer system of claim 53 wherein the at least one status bit is configured to indicate whether or not the first queue is reserved to support a previously requested data transfer.

56. The computer system of claim 53 wherein the control logic is configured to set the at least one status bit to indicate that the data in the first queue is valid for a single output operation in response to the data in the second portion of the first queue having a data value at a head of the second portion that was received via the first bus from the same address as a data value at a head of a second queue of which no portion has been output to the second bus.

57. The computer system of claim 53 wherein the control logic is configured to set the at least one status bit to indicate that the data in the first queue is valid for a single output operation if the first queue is a least recently allocated queue among a plurality of queues comprising data, a portion of which has been output to the second bus.

* * * * *

UNITED STATES PATENT AND TRADEMARK OFFICE
CERTIFICATE OF CORRECTION

PATENT NO.    : 6,170,030 B1
DATED         : January 2, 2001
INVENTOR(S)   : Bell It is certified that error appears in the above-identified patent and that said Letters Patent is hereby corrected as shown below:

Column 7,
Line 38, after "tracker", insert -- registers --.

Signed and Sealed this

Twenty-fourth Day of September, 2002

Attest:

Attesting Officer

JAMES E. ROGAN
Director of the United States Patent and Trademark Office